US012712423B2

(12) United States Patent
Toliyat et al.

(10) Patent No.: US 12,712,423 B2
(45) Date of Patent: Aug. 18, 2026

(54) MAGNETIC GEAR SYSTEMS, METHODS, AND APPARATUSES

(71) Applicants: The Texas A&M University System, College Station, TX (US); Board of Regents, The University of Texas System, Austin, TX (US); The United States of America as Represented by the Secretary of the Army, Washington, DC (US); US Hybrid Corporation, Torrance, CA (US)

(72) Inventors: Hamid A. Toliyat, College Station, TX (US); Bryton Praslicka, College Station, TX (US); Daniel Zamarron, Bryan, TX (US); Matthew C. Gardner, Dallas, TX (US); Matthew C. Johnson, College Station, TX (US); Abas Goodarzi, Rolling Hills, CA (US); Enzo Bauk, Lakewood, CA (US); Alex Nguyen, Fullerton, CA (US); Shima Hasanpour, College Station, TX (US); Godwin Yuan Duan, Plano, TX (US); Salek Ahmed Khan, Richardson, TX (US)

(73) Assignees: The Texas A&M University System, College Station, TX (US); Board of Regents, The University of Texas System, Austin, TX (US); The United States of America as Represented by the Secretary of the Army, Washington, DC (US)

( * ) Notice: Subject to any disclaimer, the term of this patent is extended or adjusted under 35 U.S.C. 154(b) by 289 days.

(21) Appl. No.: 18/273,941

(22) PCT Filed: Jan. 25, 2022

(86) PCT No.: PCT/US2022/013731
§ 371 (c)(1),
(2) Date: Jul. 24, 2023

(87) PCT Pub. No.: WO2022/159900
PCT Pub. Date: Jul. 28, 2022

(65) Prior Publication Data

US 2024/0297563 A1 Sep. 5, 2024

Related U.S. Application Data

(60) Provisional application No. 63/188,009, filed on May 13, 2021, provisional application No. 63/185,090, (Continued)

(51) Int. Cl.
*H02K 51/00* (2006.01)
*H02K 16/00* (2006.01)

(52) U.S. Cl.
CPC ............. *H02K 51/00* (2013.01); *H02K 16/00* (2013.01); *H02K 2213/12* (2013.01)

(58) Field of Classification Search
CPC ..... H02K 16/00; H02K 51/00; H02K 2213/12
(Continued)

(56) References Cited

U.S. PATENT DOCUMENTS

| | | | | |
|---|---|---|---|---|
| 6,975,045 | B2 * | 12/2005 | Kurachi | H02K 7/183 290/55 |
| 2002/0024267 | A1 * | 2/2002 | Sakamoto | H02K 21/225 310/75 C |

(Continued)

FOREIGN PATENT DOCUMENTS

| | | | |
|---|---|---|---|
| CN | 108270339 | A | 7/2018 |
| SK | 8188 | Y1 | 8/2018 |
| WO | 2011036552 | A1 | 3/2011 |

OTHER PUBLICATIONS

Praslicka et al. "Practical Analysis and Design of a 50: 1 Cycloidal Magnetic Gear with Balanced Off-Axis Moments and a High Specific Torque for Lunar Robots." 2021 IEEE International Electric Machines & Drives Conference (IEMDC). IEEE, 2021, available online May 18, 2021 (May 18, 2021) [online] <https://cpb-us-e2.wpmucdn.com/labs.utdallas.edu/dist/9/93/files/2021/09/MultisectionCycloidal .pdf>.

*Primary Examiner* — Rashad H Johnson
(74) *Attorney, Agent, or Firm* — Jackson Walker LLP

(57) ABSTRACT

Aspects of the disclosure relate to a cycloidal magnetic gear. The cycloidal magnetic gear includes an outer rotor. A plurality of magnetic pole pairs is disposed on an inner circumference of the outer rotor. A first, second, and third inner rotor is disposed within the outer rotor. The first, second, and third inner rotors includes a magnetic pole pairs disposed on an outer circumference thereof. The first inner rotor and the third inner rotor have a thickness of approximately half the thickness of the second inner rotor. The first inner rotor, the second inner rotor, and the third inner rotor balance moments acting on a drive shaft.

13 Claims, 39 Drawing Sheets

Related U.S. Application Data filed on May 6, 2021, provisional application No. 63/141,130, filed on Jan. 25, 2021.

(58) Field of Classification Search
USPC .......................................................... 310/75 R
See application file for complete search history.

(56) References Cited

U.S. PATENT DOCUMENTS

2005/0194790 A1* 9/2005 Kurachi ................. H02K 7/183 290/44
2008/0238232 A1* 10/2008 Bando .................... H02K 1/276 310/156.08
2010/0183460 A1* 7/2010 Qin ........................ H02K 23/30 417/423.7
2011/0012458 A1* 1/2011 Atallah .................. H02K 51/00 310/103
2011/0037333 A1* 2/2011 Atallah .................... H02K 7/11 310/98
2011/0042965 A1* 2/2011 Atallah .................. H02K 51/00 290/44
2011/0057456 A1* 3/2011 Atallah ................ H02K 49/102 310/104
2011/0115326 A1* 5/2011 Clark ....................... H02K 7/11 310/114
2011/0121672 A1* 5/2011 Calverley ............ H02K 49/102 310/216.113
2011/0121674 A1* 5/2011 Bright .................... H02K 51/00 310/103
2011/0127869 A1* 6/2011 Atallah .................. H02K 49/06 310/94
2011/0148237 A1 6/2011 Toot
2011/0156518 A1* 6/2011 Bright .................. H02K 49/102 310/156.03
2014/0132099 A1* 5/2014 Nakatsugawa ........ H02K 16/02 310/102 R
2014/0300223 A1* 10/2014 Yamada ............... H02K 11/042 310/54
2014/0319951 A1* 10/2014 Xie .......................... H02K 3/47 310/156.01
2016/0049855 A1 2/2016 Davey
2017/0222494 A1* 8/2017 Hunstable .............. H02K 21/12
2018/0062490 A1* 3/2018 Knight ................... H02K 17/32
2018/0152130 A1* 5/2018 Deguchi ............. H02P 25/0805
2018/0212486 A1* 7/2018 Hunstable .............. H02K 15/08
2018/0269763 A1* 9/2018 Lin ........................ H02K 1/146
2018/0328447 A1 11/2018 Dieckhoff et al.
2019/0199185 A1* 6/2019 Hunstable .............. H02K 21/12
2020/0091809 A1 3/2020 Bird
2020/0350800 A1* 11/2020 Hurry .................... H02K 5/207
2021/0057973 A1* 2/2021 Hunstable .............. H02K 3/525
2021/0071746 A1* 3/2021 Kim ..................... H02K 49/102
2021/0313851 A1* 10/2021 Zhou ...................... H02K 1/145
2022/0045582 A1* 2/2022 Hunstable .............. H02K 15/08
2023/0025203 A1* 1/2023 Kometani .............. H02K 7/183
2023/0046584 A1* 2/2023 Okabe .................... H02K 16/02
2023/0049224 A1* 2/2023 Sakai ................... H02K 49/102
2023/0412023 A1* 12/2023 Hunstable ................ H02K 1/30

* cited by examiner

MAGNETIC GEAR SYSTEMS, METHODS, AND APPARATUSES

CROSS-REFERENCE TO RELATED APPLICATIONS

This patent application claims priority to, and incorporates by reference the entire disclosure of, U.S. Provisional Patent Application No. 63/141,130, filed on Jan. 25, 2021; U.S. Provisional Patent Application No. 63/185,090, filed on May 6, 2021; and U.S. Provisional Patent Application No. 63/188,009, filed on May 13, 2021.

STATEMENT REGARDING FEDERALLY SPONSORED RESEARCH

This invention was made with government support under grant number 28-517790-00001 awarded by the National Aeronautics and Space Administration. The government has certain rights in the invention.

TECHNICAL FIELD

The present disclosure relates generally to magnetic gears and more particularly, but not by way of limitation, to magnetic gear systems, methods, and apparatuses.

BACKGROUND

This section provides background information to facilitate a better understanding of the various aspects of the disclosure. It should be understood that the statements in this section of this document are to be read in this light, and not as admissions of prior art.

Magnetic gears perform the same task as their mechanical counterparts; however, they do so through the modulated interaction between the flux generated by magnets instead of through mechanical interaction between gear teeth. In the case of cycloidal gear arrangements, the orbital motion of the inner rotor can result in undesirable mechanical vibrations if the center of mass of the inner rotor is not along the center of the stationary outer rotor's axis. Multiple rotor segments can be used to balance the gearbox. However, using multiple rotor segments will result in an off-axis moment due to the magnetic interaction between the inner rotor and the outer rotor if the magnetic moments are not balanced.

SUMMARY

This summary is provided to introduce a selection of concepts that are further described below in the Detailed Description. This summary is not intended to identify key or essential features of the claimed subject matter, nor is it to be used as an aid in limiting the scope of the claimed subject matter.

Aspects of the disclosure pertain to a cycloidal magnetic gear having an outer rotor, a first plurality of magnetic pole pairs disposed on an inner circumference of the outer rotor, a first inner rotor disposed within the outer rotor and having a second plurality of magnetic pole pairs disposed on an outer circumference thereof, a second inner rotor disposed within the outer rotor and having a third plurality of magnetic pole pairs disposed on an outer circumference thereof, a third inner rotor disposed within the outer rotor and having a fourth plurality of magnetic pole pairs disposed on an outer circumference thereof. The first inner rotor and the third inner rotor have a thickness of approximately half the thickness of the second inner rotor. The first inner rotor, the second inner rotor, and the third inner rotor balance moments acting on a drive shaft.

Aspects of the disclosure pertain to a method of assembling a cycloidal magnetic gear. the method includes coupling a first plurality of magnetic pole pairs, a second plurality of magnetic pole pairs, and a third plurality of magnetic pole to an inner circumference of an outer rotor, coupling a first inner rotor, a second inner rotor, and a third inner rotor to an input shaft, coupling a fourth plurality of magnetic pole pairs to the first inner rotor, a fifth plurality of magnetic pole pairs to the second inner rotor, and a sixth plurality of magnetic pole pairs to the third inner rotor, and disposing the first inner rotor, the second inner rotor, and the third inner rotor within the outer rotor such that the fourth plurality of magnetic pole pairs interacts with the first plurality of magnetic pole pairs, the fifth plurality of magnetic pole pairs interacts with the second plurality of magnetic pole pairs, and the sixth plurality of magnetic pole pairs interacts with the third plurality of magnetic pole pairs.

Aspects of the disclosure pertain to a cycloidal magnetic gear having an outer rotor, a first plurality of teeth formed in the outer rotor, a first plurality of permanent magnets disposed between adjacent teeth of the plurality of teeth of the outer rotor, a first inner rotor disposed within the outer rotor and having a second plurality of teeth formed on an outer circumference thereof, a second plurality of permanent magnets being disposed between adjacent teeth of the second plurality of teeth, a second inner rotor disposed within the outer rotor and having a third plurality of teeth formed on an outer circumference thereof, a third plurality of permanent magnets being disposed between adjacent teeth of the third plurality of teeth, a third inner rotor disposed within the outer rotor and having a fourth plurality of teeth formed on an outer circumference thereof, a fourth plurality of permanent magnets being disposed between adjacent teeth of the fourth plurality of teeth The first inner rotor and the third inner rotor have an axial length of approximately half the thickness of the second inner rotor. The first inner rotor, the second inner rotor, and the third inner rotor balance moments acting on a drive shaft.

Aspects of the disclosure pertain to a cycloidal magnetic gear having an outer rotor, an inner rotor, a plurality of permanent magnets disposed around a perimeter of at least one of the outer rotor or the inner rotor, and a plurality of non-magnetic spacers positioned between individual magnets of the plurality of permanent magnets.

Aspects of the disclosure pertain to a cycloidal magnetic gear having an outer rotor, an inner rotor, a plurality of permanent magnets disposed around a perimeter of at least one of the outer rotor or the inner rotor, and a keyway formed in at least one of the outer rotor or the inner rotor.

Aspects of the disclosure pertain to a method of producing a multi-rotor cycloidal magnetic gear. The method includes forming an outer rotor back iron, forming an inner rotor back iron, cutting the inner rotor along a plane perpendicular to a central axis of the inner rotor to produce multiple inner rotors, locating a first plurality of permanent magnets on the outer rotor back iron, and locating a second plurality of permanent magnets on the inner rotor back iron to form an inner rotor.

Aspects of the disclosure pertain to a cycloidal magnetic gear system having a first cycloidal magnetic gear having a first input shaft and a first output shaft, a second cycloidal magnetic gear that receives an input from the first output shaft and includes a second output shaft. The first output shaft is supported by a first bearing and a second bearing.

Aspects of the disclosure pertain to a cycloidal magnetic gear having a first rotor. The first rotor includes at least one of a plurality of magnetic pole pairs disposed on the first rotor, or a plurality of first-rotor permanent magnets disposed on the first rotor and a plurality of first-rotor ferromagnetic teeth formed on the first rotor, each tooth of the plurality of first-rotor ferromagnetic teeth being disposed between sequential magnets of the plurality of first-rotor permanent magnets. The plurality of first-rotor ferromagnetic teeth become consequently magnetized by the plurality of first-rotor permanent magnets. The cycloidal magnetic gear further includes a second rotor, a plurality of permanent magnets disposed on the second rotor, a plurality of ferromagnetic teeth formed on the second rotor, each tooth of the plurality of ferromagnetic teeth being disposed between sequential magnets of the plurality of permanent magnets. The plurality of ferromagnetic teeth become consequently magnetized by the plurality of permanent magnets.

Aspects of the disclosure pertain to a cycloidal magnetic gear having a first rotor, a second rotor, a plurality of magnetic pole pairs disposed on the first rotor, a plurality of ferromagnetic teeth formed on the second rotor. The second rotor interacts with the first rotor due to magnetic reluctance.

Aspects of the disclosure pertain to a cycloidal magnetic gear having an outer rotor, an inner rotor disposed within the outer rotor, an air gap defined between the outer rotor and the inner rotor, and a flux shield disposed in the air gap between the outer rotor and the inner rotor. The flux shield extending partially around a circumference of the air gap.

Aspects of the disclosure pertain to a concentric gear system having a first rotor. The first rotor having at least one of a plurality of permanent magnets, a plurality of magnetically permeable teeth, or a plurality of electromagnets. The concentric gear system further includes a second rotor. The second rotor includes at least one of a plurality of permanent magnets, a plurality of magnetically permeable teeth, or a plurality of electromagnets. The concentric gear system further includes a modulator disposed between the first rotor and the second rotor, the modulator having a plurality of magnetically permeable segments that are arranged in an alternating fashion with a plurality of non-magnetic segments. Each magnetically permeable segment of the plurality of magnetically permeable segments is disposed between consecutive non-magnetic segments of the plurality of non-magnetic segments. Each magnetically permeable segment of the plurality of magnetically permeable segments and each non-magnetic segment of the plurality of non-magnetic segments are formed with a protrusion extending outwardly from a first end and an indentation extending inwardly from a second end.

Aspects of the disclosure pertain to a concentric gear system having a first rotor. The first rotor includes at least one of a plurality of permanent magnets, a plurality of magnetically permeable teeth, or a plurality of electromagnets. The concentric gear system further includes a second rotor. The second rotor includes at least one of a plurality of permanent magnets, a plurality of magnetically permeable teeth, or a plurality of electromagnets. The concentric gear system further includes a modulator having a plurality of magnetically permeable modulator segments. Each modulator segment of the plurality of modulator segments maps an electromagnetic angle from the first plurality of magnetic pole pairs to the second plurality of magnetic pole pairs.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Harmonic drives and cycloidal type drives are the most common mechanical gearboxes used to achieve high torque density at higher gear ratios (often greater than 30:1). Cycloidal type magnetic gears have been developed in attempt to increase the reliability and torque density relative to their mechanical counterparts.

While magnetic gears of all types offer potential advantages over mechanical gears such as improved reliability, reduced maintenance, reduced acoustic noise, and inherent overload protection, other magnetic gear topologies, such as the coaxial magnetic gear, are limited to relatively low gear ratios. Cycloidal type magnetic gears can achieve high torque densities at relatively high gear ratios. Use of multiple rotors mitigates challenges associated with cycloidal type magnetic gears, including, but not limited to the balancing of the center of mass about the axis of rotation, balancing of radial magnetic forces, and the cancellation of the off-axis moment, which would be produced if only two rotor segments were used, or if the rotor segments were all of equal length.

Like the cycloidal type mechanical gear, the inner rotor of the cycloidal type magnetic gear is parallel to, but offset from the outer rotor's axis, and it moves in an orbital revolution about the outer rotor's stationary central axis. This orbital motion rotates the air gap permeance function, which modulates the spatial flux harmonics to facilitate the gearing behavior. The orbital revolution is connected to the high-speed shaft. The low-speed rotation can be provided by either the inner rotor or the outer rotor rotating about its own axis, but various embodiments disclosed herein keep the outer rotor stationary and connect the rotation of the inner rotor about its own axis to the low-speed shaft. It should be noted that as used herein, input can be substituted for high-speed (e.g. an input shaft can be a high-speed shaft) and output can be substituted for low-speed (e.g. an output shaft can be a low-speed shaft). This terminology can be interchanged throughout the disclosures where various applications require the input components to be high-speed components or the output components to be low-speed components.

Figure 1:
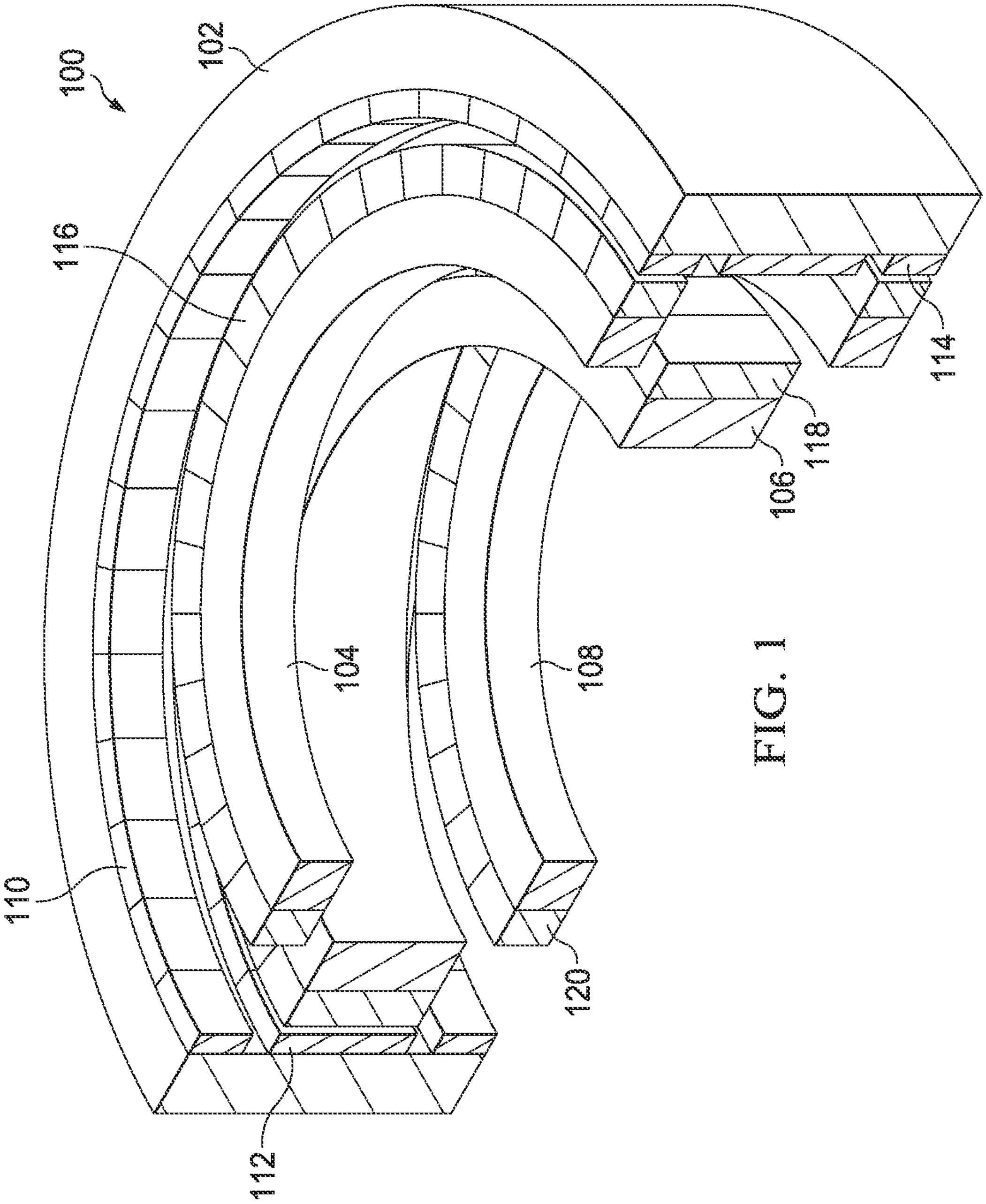
FIG. 1 is a cross-sectional view of a magnetic cycloidal gear according to aspects of the disclosure.

FIG. 1 is a cross-sectional view of a magnetic cycloidal gear 100. The magnetic cycloidal gear 100 includes an outer rotor 102, a first inner rotor 104, a second inner rotor 106, and a third inner rotor 108. In various embodiments, the outer rotor 102 remains stationary during operation; however, in various embodiments, the outer rotor 102 may rotate. A first plurality of magnetic pole pairs 110 is arranged in a linear fashion about an inner circumference of the outer rotor 102. The first inner rotor 104, the second inner rotor 106, and the third inner rotor 108 are disposed within the outer rotor 102. In various embodiments, the first inner rotor 104, the second inner rotor 106, and the third inner rotor 108 are connected to an input shaft 202 (shown in FIG. 2). The input shaft 202 is aligned with a central axis of the outer rotor 102. The axis of rotation of the first inner rotor 104 and the third inner rotor 108 are offset from the central axis to a first side of the input shaft 202 and the second inner rotor 106 is offset from the central axis to a second side of the input shaft 202 opposite the first side. Thus, the first inner rotor 104, the second inner rotor 106, and the third inner rotor 108 revolve about the central axis of the outer rotor 102 in additional to rotating about each of their respective central axes.

Still referring to FIG. 1, a second plurality of magnetic pole pairs 116 is disposed on the outer circumference of the first inner rotor 104. A third plurality of magnetic pole pairs 118 is disposed on the outer circumference of the second inner rotor 106, and a fourth plurality of magnetic pole pairs 120 is disposed on the outer circumference of the third inner rotor 108. The second plurality of magnetic pole pairs 116, the third plurality of magnetic pole pairs 118, and the fourth plurality of magnetic pole pairs 120 interact with the first plurality of magnetic pole pairs 110. In various embodiments, a fifth plurality of magnetic pole pairs 112 and a sixth plurality of magnetic pole pairs 114 are arranged in a linear fashion about an inner circumference of the outer rotor 102 in such a manner that the first plurality of magnetic pole pairs 110, the fifth plurality of magnetic pole pairs 112, and the sixth plurality of magnetic pole pairs 114 are parallel to each other. In such an embodiment, the second plurality of magnetic pole pairs 116 interacts with the first plurality of magnetic pole pairs 110, the third plurality of magnetic pole pairs 118 interacts with the fifth plurality of magnetic pole pairs 112, and the fourth plurality of magnetic pole pairs 120 interacts with the sixth plurality of magnetic pole pairs 114.

Still referring to FIG. 1, the first inner rotor 104 and the third inner rotor 108 each have a thickness that is approximately one half the thickness of the second inner rotor 106. Thus, the second inner rotor 106 has approximately twice the individual masses of the first inner rotor 104 and the third inner rotor 108. Additionally, the first inner rotor 104 and the third inner rotor 108 move together in an orbital fashion about the input shaft 202. The second inner rotor 106 moves in an orbital fashion around the input shaft in the same rotational direction as the first inner rotor 103 and the third inner rotor 108, but on a side of the input shaft opposite the first inner rotor 104 and the third inner rotor 108. Such an arrangement cancels off-axis moments acting on the input shaft 202 in addition to balancing mass and force on the input shaft 202. Such an arrangement decreases vibrations and reduces stress on the magnetic cycloid gear 100 during operation.

In various embodiments, the first plurality of magnetic pole pairs 110, the second plurality of magnetic pole pairs 116, the third plurality of magnetic pole pairs 118, the fourth plurality of magnetic pole pairs 120, the fifth plurality of magnetic pole pairs 112, and the sixth plurality of magnetic pole pairs 114 may be formed of, for example, permanent magnets such as, for example, those incuding rare-earths or ferrite. The outer rotor 102, the first inner rotor 104, the second inner rotor 106, and the third inner rotor 108 may, in various embodiments, be formed of, for example, magnetically permeable steel, soft magnetic composites, carbon fiber reinforced polymer, magnetically impermeable steel, aluminum, fiberglass, or plastic. In various embodiments, the first plurality of magnetic pole pairs 110, the second plurality of magnetic pole pairs 116, the third plurality of magnetic pole pairs 118, the fourth plurality of magnetic pole pairs 120, the fifth plurality of magnetic pole pairs 112, and the sixth plurality of magnetic pole pairs 114 include aligned adjacent permanent magnets. The permanent magnets are arranged in an alternating magentic polarity pattern such that each permanent magnet is of the opposite magnetic polarity as the adjacent permanent magnets on either side. Thus, the first plurality of magnetic pole pairs 110, the second plurality of magnetic pole pairs 116, the third plurality of magnetic pole pairs 118, the fourth plurality of magnetic pole pairs 120, the fifth plurality of magnetic pole pairs 112, and the sixth plurality of magnetic pole pairs 114 include permanent magnets arranged in a North, South, North, South, etc. pattern.

Figure 2:
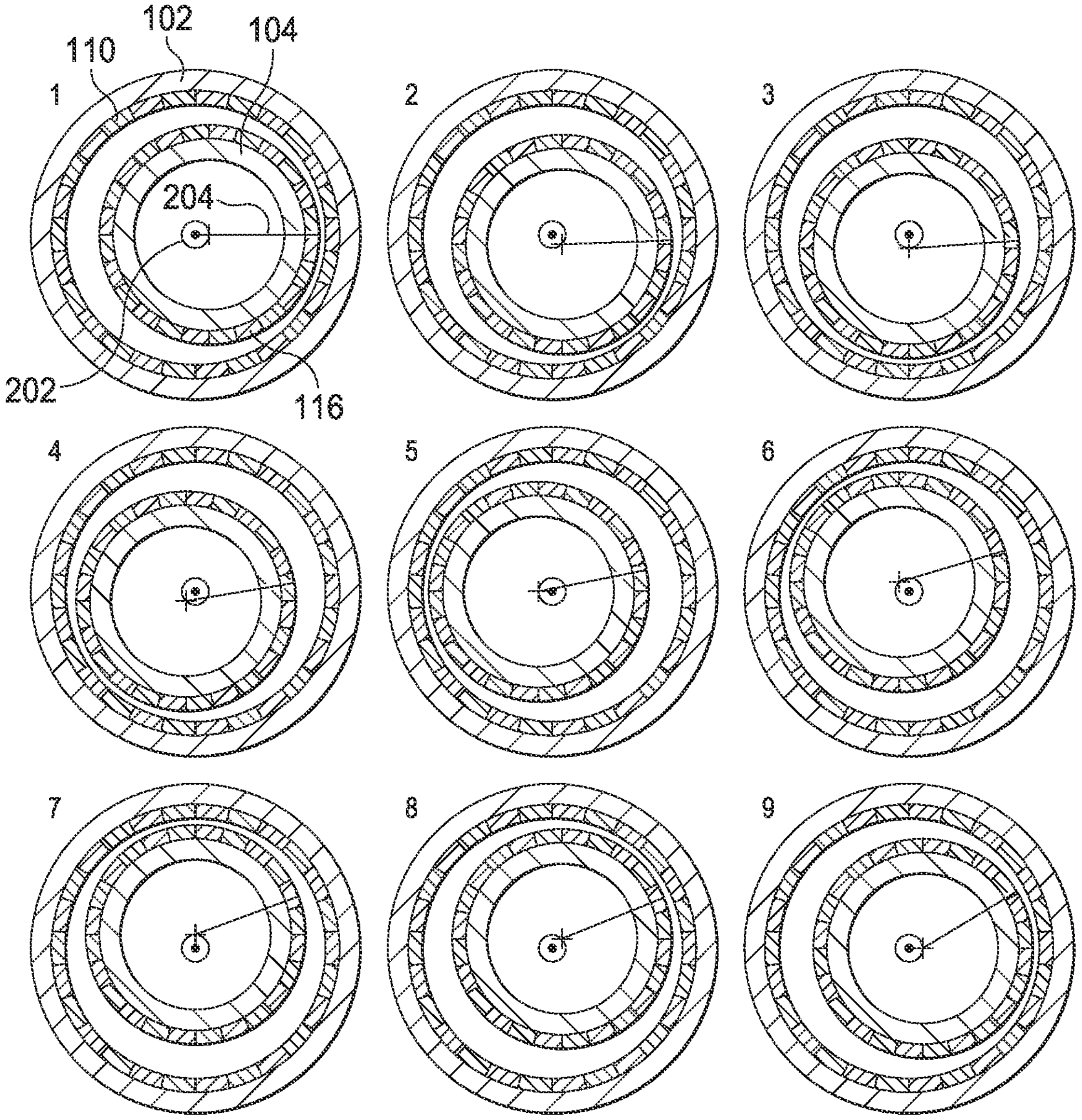
FIG. 2 is a sequential diagram illustrating orbital movement of an inner cycloidal rotor relative to rotation of the inner cycloidal rotor according to aspects of the disclosure.

FIG. 2 is a sequential diagram illustrating orbital movement of an inner rotor relative to rotation of the inner rotor. For purposes of discussion, the inner rotor illustrated in FIG. 2 will be described as the first inner rotor 104; however, the second inner rotor 106 and the third inner rotor 108 will follow the same pattern of movement. Line 204 illustrates a rotational position of the first inner rotor 104. As the first inner rotor 104 progresses through one orbital revolution illustrated in stages 1-9, the first inner rotor 104 rotates about its own axis. Thus, when one full orbital revolution is completed by the first inner rotor 104, the first inner rotor 104 will have rotated by one pole pair relative to the outer rotor 102. In various embodiments, rotation of the first inner rotor 104 drives an output shaft (not explicitly shown).

Figure 3A:
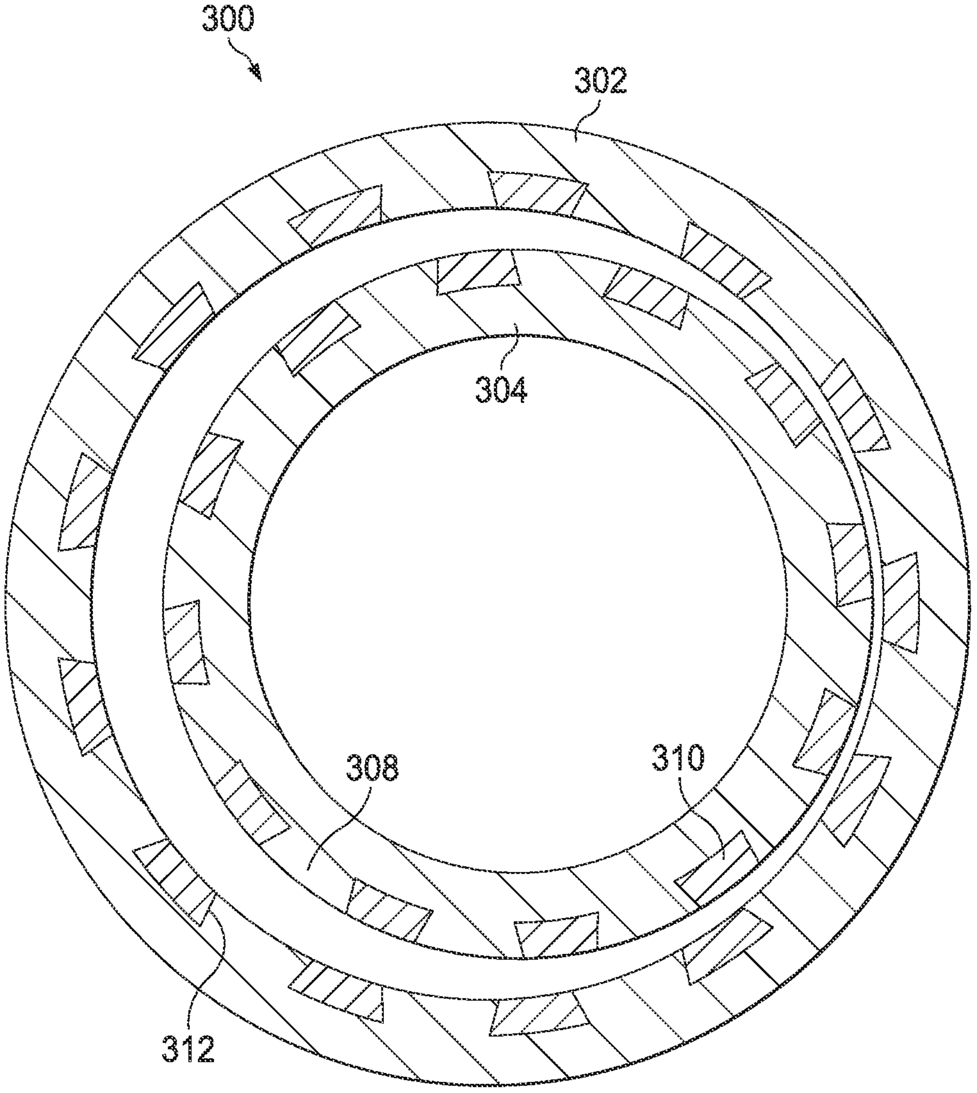
FIG. 3A is a cross-sectional diagram of a cycloidal magnetic gear utilizing a consequent pole arrangement according to aspects of the disclosure.

FIG. 3A is a cross-sectional diagram of a cycloidal magnetic gear 300 utilizing a consequent pole arrangement. The cycloidal magnetic gear 300 includes an outer rotor 302, a first inner rotor 304, a second inner rotor 306 (shown in FIG. 4), and a third inner rotor 307 (shown in FIG. 4). In various embodiments, the outer rotor 302, the first inner rotor 304, the second inner rotor 306, and the third inner rotor 307 of the cycloidal magnetic gear 300 are arranged similar to the outer rotor 102, the first inner rotor 104, the second inner rotor 106, and the third inner rotor 108 of the cycloidal magnetic gear 100. For simplicity of discussion, the construction of the first inner rotor 304 will be described; however, the construction of the second inner rotor 306 and the third inner rotor 307 of the cycloidal magnetic gear 300 are similar. In various embodiments, the cycloidal magnetic gear 300 utilizing a consequent pole arrangement may include a single inner rotor 304 (the consequent pole does not need to have multiple rotor sections).

Still referring to FIG. 3A, the outer rotor 302 includes a plurality of teeth 308 formed around an interior circumference. Permanent magnets 310 are disposed between the teeth 308. In various embodiments, the permanent magnets 310 are of the same magnetic polarity. As a consequence of the permanent magnets 310, the teeth 308 become magnetized with the opposite polarity. In various embodiments, the teeth 308 may be arranged to hold the permanent magnets 310 in place. For example, in the embodiment illustrated in FIG. 3A, the teeth 308 include tapered edges 312. The tapered edges 312 secure the permanent magnets 310 and eliminate the need for an additional magnet retention mechanism such as, for example, a retention sleeve. In various embodiments, the teeth 308 may be constructed to be narrower than the permanent magnets 310. Such an arrangement facilitates the use of wider and more manufacturing-friendly permanent magnets 310. This is particularly true of cycloidal magnetic gears having a high gearing ratio, and thus requiring a large number of magnetic pole pairs. In various embodiments, the cycloidal magnetic gear 300 may utilize less permanent magnet material than that of a surface permanent magnet configuration with the same gear ratio, such as that utilized in the cycloidal magnetic gear 100.

Figure 3B:
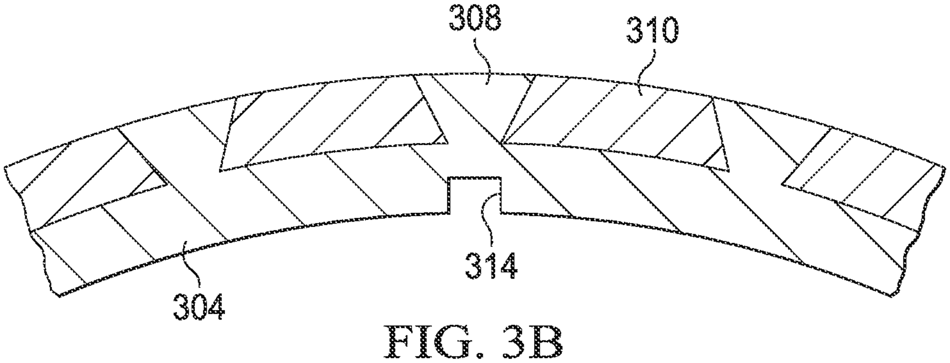
FIG. 3B is a schematic diagram of an inner rotor of a cycloidal magnetic gear having a keyway formed therein according to aspects of the disclosure.
Figure 3C:
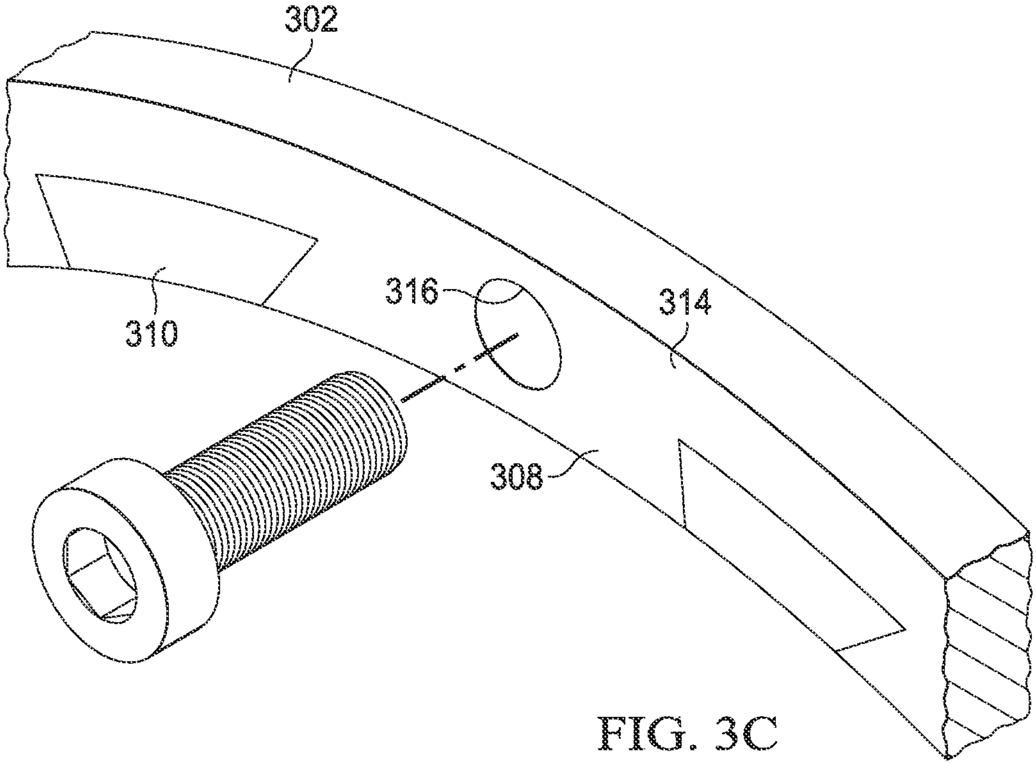
FIG. 3C is a schematic diagram of an outer rotor of a cycloidal magnetic gear having a through hole formed therein according to aspects of the disclosure.
Figure 3D:
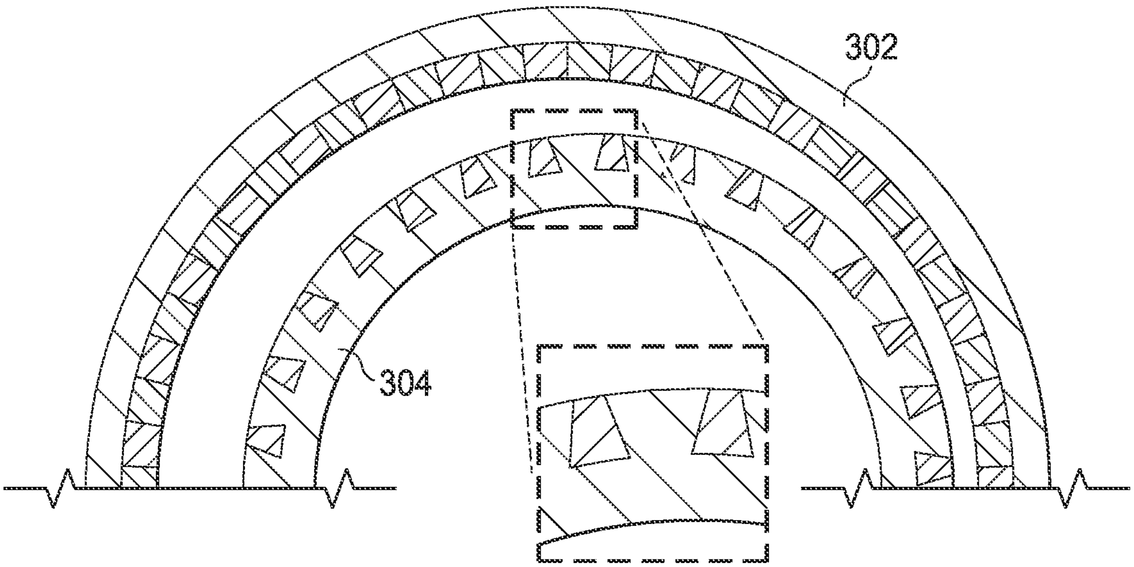
FIG. 3D is a schematic diagram of a cycloidal magnetic gear having a surface permanent magnet outer rotor and a consequent pole inner rotor according to aspects of the disclosure.

Still referring to FIG. 3A, a consequent pole type configuration is similar to the surface permanent magnet cycloidal magnetic gear, but replaces the North-South permanent magnet pole pairs (2 permanent magnets) with North-Tooth or South-Tooth pairs (1 permanent magnet and 1 ferromagnetic tooth). As a consequence of the permanent magnet 310, the ferromagnetic teeth 308 becomes a magnetic pole of the opposite polarity. Thus, the permanent magnets 310 magnetize the teeth 308. In various embodiments, the teeth 308 and the permanent magnets 310 geometries may be modified in such a way that the teeth 308 hold the permanent magnets 310 in place. In various embodiments, the teeth 308 and the permanent magnets 310 are of unequal size. As shown in FIG. 3B, in various embodiments, the permanent magnet 310 may span more than half of a pole pair arc, thus the permanent magnets 310 arc length may be larger than the arc length of the teeth 308. Also shown in FIG. 3B, a keyway, spline, groove, or flux barrier 314 may, in various embodiments, be implemented behind the teeth 308. As shown in FIG. 3C, for the outer rotor 302, in various embodiments, the teeth 308 themselves or the space behind the teeth 308 in the back iron 313 could be utilized as the location for a through hole 316 that allows structural materials 318, such as a bolt or screw, to facilitate the mounting of the cycloidal type magnetic gear 300. As an alternative embodiment, the inner rotor 304 may remain consequent pole, while the outer rotor 302 may be surface permanent magnet type, or vice versa, to produce more flux in the air gap, as shown in FIG. 3D.

Figure 3E:
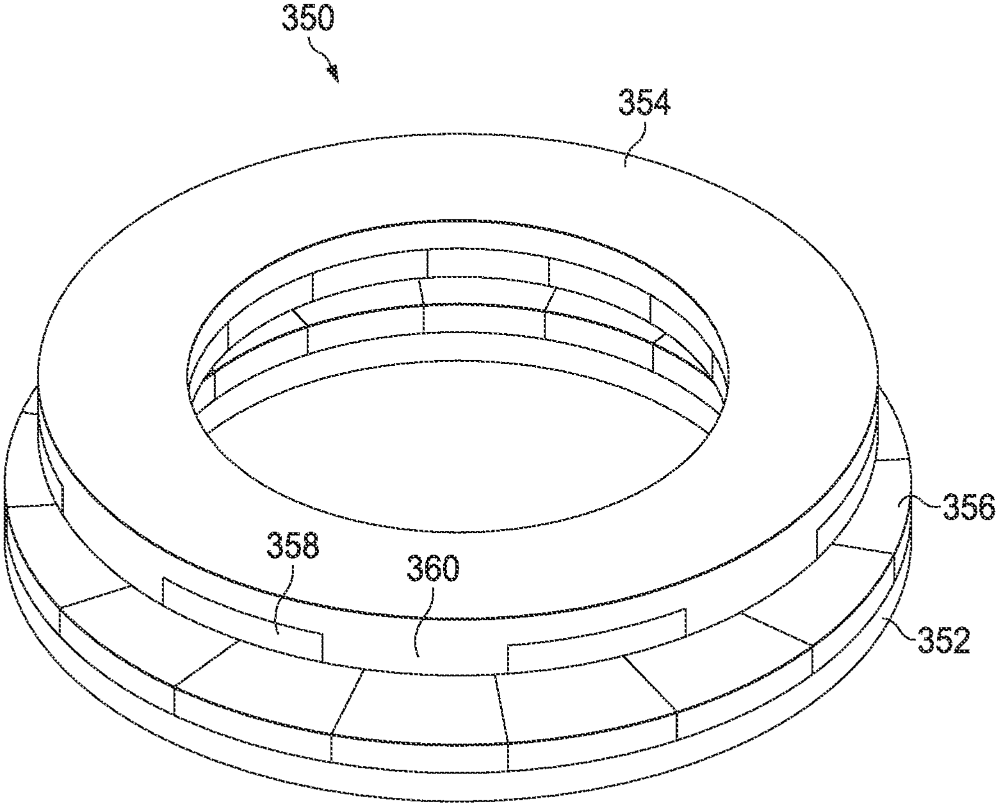
FIG. 3E is a schematic diagram of a cycloidal magnetic gear utilizing an axially-magnetized consequent pole arrangement according to aspects of the disclosure (top rotor—surface permanent magnet; bottom rotor—consequent)

FIG. 3E is a schematic diagram of a cycloidal magnetic gear 350 utilizing an axially-magnetized consequent pole arrangement. The cycloidal magnetic gear 350 includes a first rotor 352 and a second rotor 354. A plurality of magnetic pole pairs 356 are disposed on an axial surface of the first rotor 352. A plurality of permanent magnets 358 are disposed on an axial surface of the second rotor 354 and a plurality of ferromagnetic teeth 360 are disposed between the successive permanent magnets 358 of the plurality of permanent magnets 358. During operation, the plurality of permanent magnets 358 cause the plurality of ferromagnetic teeth 360 to become consequently magnetized with a polarity opposite the plurality of permanent magnets 358. The first rotor 352 is aligned with the second rotor 354 in an axial fashion such that the plurality of magnetic pole pairs 356 of the first rotor 352 interact with the plurality of permanent magnets 358 and the plurality of ferromagnetic teeth 360 due to magnetic flux in an axial direction relative to the first rotor 352 and the second rotor 354.

Figure 4:
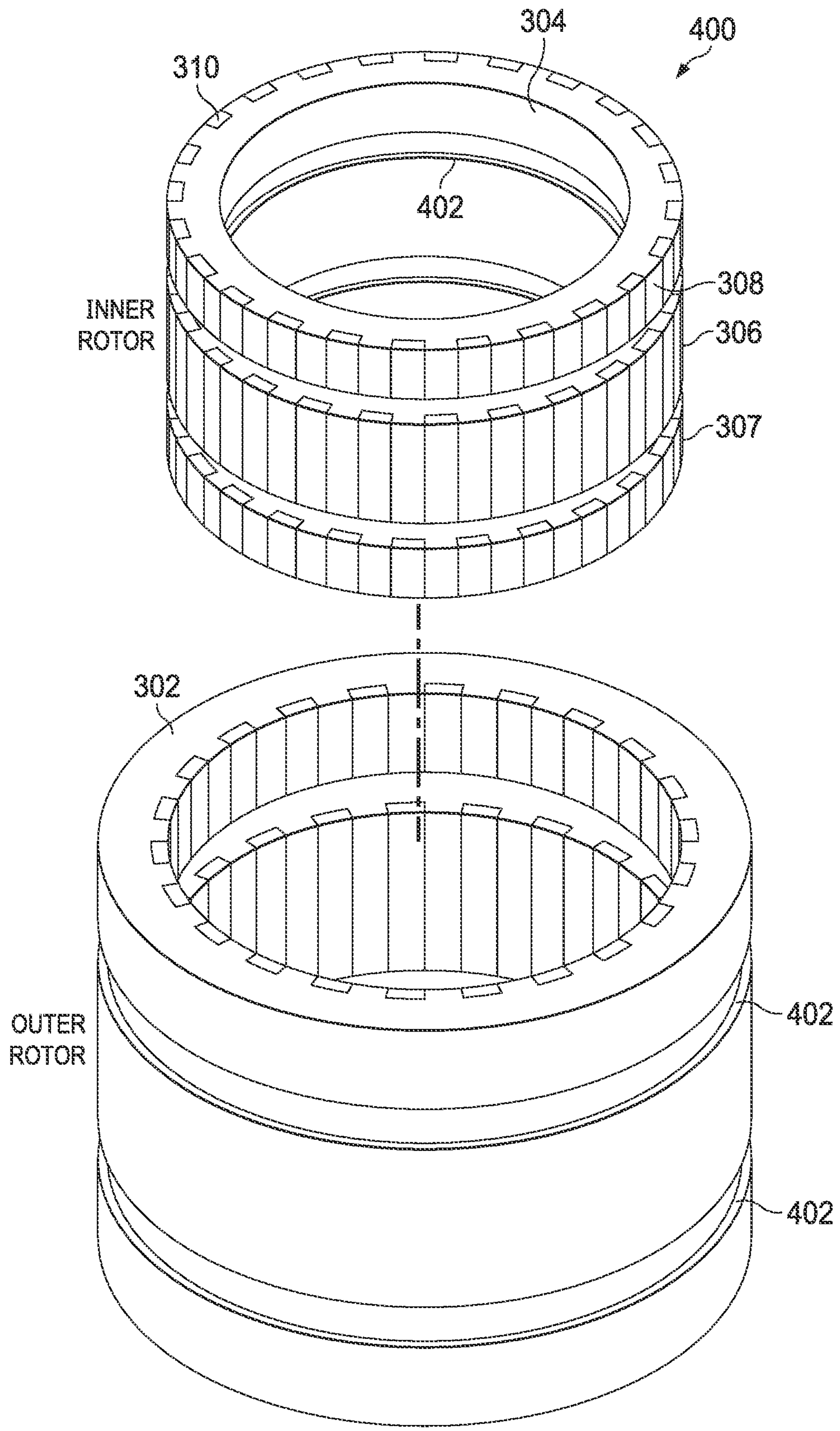
FIG. 4 is an exploded view of a cycloidal magnetic gear utilizing both radially and axially magnetized magnets according to aspects of the disclosure.

FIG. 4 is an exploded view of a cycloidal magnetic gear 400 utilizing both radially and axially magnetized magnets. In various embodiments, axially magnetized magnets 402 are utilized to magnetize the teeth 308 and create consequent poles. In various embodiments, the radially magnetized permanent magnets 310 could be eliminated and the axially magnetized permanent magnets 402 could be utilized. Such an arrangement could simplify magnetizing of the axially magnetized permanent magnets 402 and simplify assembly of the cycloidal magnetic gear 400. As illustrated in FIG. 4, a hybrid arrangement containing both the axially magnetized permanent magnets 402 and the radially magnetized permanent magnets 310 could be utilized. In various embodiments, any combination of the axially magnetized permanent magnets 402 and the radially magnetized permanent magnets 310 could be utilized. Using both the axially magnetized permanent magnets 402 and the radially magnetized permanent magnets 310 could increase the torque density and/or the specific torque of the cycloidal magnetic gear 400. In various embodiments, different axial magnetization directions could be used (either both magnetized in the same direction or magnetized in opposite directions). Any combination of any of the scenarios on the inner rotor 304 and the outer rotor 302 is possible. This embodiment may exist with any number of axial segments greater than one.

Alternatively, the magnets may be embedded on one or both of the inner rotor 304 and the outer rotor 302, rather than mounted on their respective surfaces. The interior permanent magnet configuration simplifies assembly, as the magnets can be inserted into slots in the rotor, rather than needing to be affixed to its surface, and the interior permanent magnet configuration may provide some reluctance torque, in addition to the conventional reactance torque. The magnets in an interior permanent magnet rotor may be arranged in a variety of configurations, including (but not limited to) V, U, and double V, as in interior permanent magnet motors.

Figure 5:
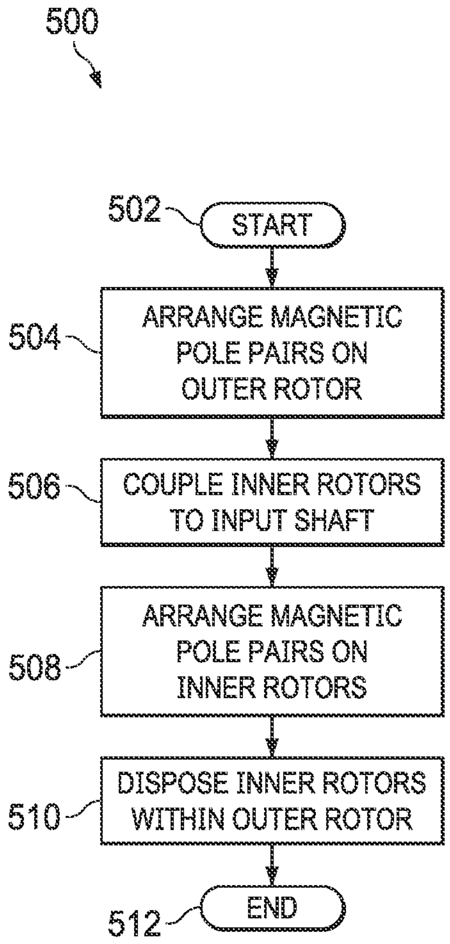
FIG. 5 is a flow diagram illustrating a process of assembling a cycloidal magnetic gear according to aspects of the disclosure.

FIG. 5 is a flow diagram illustrating a process 500 for assembling a cycloidal magnetic gear 100. The process 500 begins at step 502. At step 504, the first plurality of magnetic pole pairs 110 are disposed around an inner circumference of the outer rotor 102. At step 506, the first inner rotor 104, the second inner rotor 106, and the third inner rotor 108 are coupled to an input shaft 202. At step 508, the second plurality of magnetic pole pairs 116 is disposed on an outer circumference of the first inner rotor 104, the third plurality of magnetic pole pairs 118 is disposed on an outer circumference of the second inner rotor 106, and the fourth plurality of magnetic pole pairs 120 is disposed on an outer circumference of the third inner rotor 108. In various embodiments, the first inner rotor 104 and the third inner rotor 108 are positioned such that the first inner rotor 104 and the third inner rotor 108 are offset from a central axis of the outer rotor 102 towards a first side and the second inner rotor 106 is positioned such that the second inner rotor is offset from the central axis of the outer rotor 102 towards a second side. In various embodiments, the fifth plurality of magnetic pole pairs 112 and the sixth plurality of magnetic pole pairs 114 are disposed about the inner circumference of the outer rotor 102 parallel to the first plurality of magnetic pole pairs 110. In such an embodiment, the second plurality of magnetic pole pairs 116 interacts with the first plurality of magnetic pole pairs, the third plurality of magnetic pole pairs 118 interacts with the third plurality of magnetic pole pairs 120 interacts with the fifth plurality of magnetic pole pairs 112, and the fourth plurality of magnetic pole pairs 120 interacts with the sixth plurality of magnetic pole pairs 114. At step 510, the first inner rotor 104, the second inner rotor 106, and the third inner rotor 108 are positioned within the outer rotor 102. The process 500 ends at step 512. For purposes of discussion, the above noted steps 504-510 need not be performed in the order discussed herein and, in various embodiments, the steps 504-510 could be performed in any order.

Figure 6:
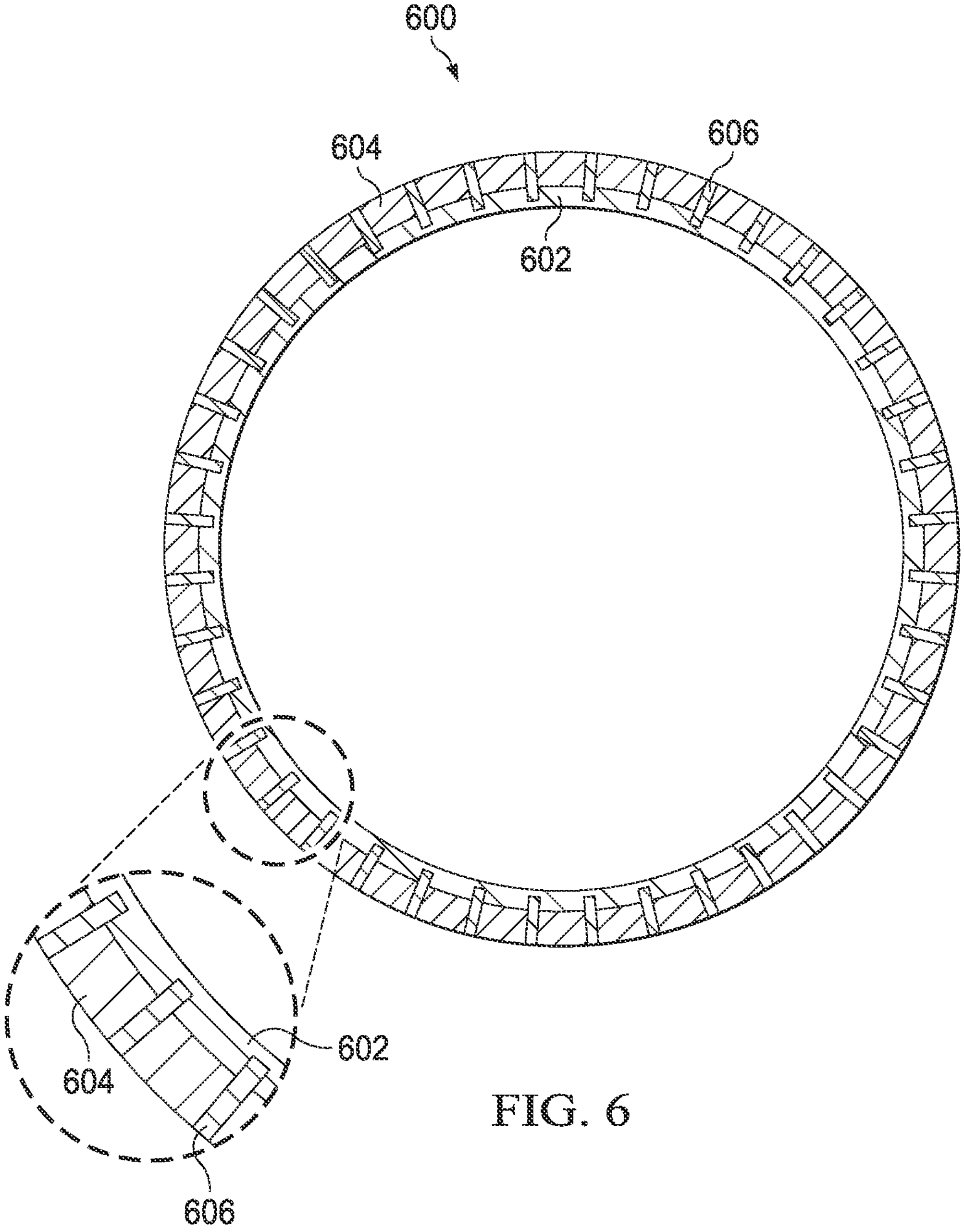
FIG. 6 is a cross-sectional view of a magnetic cycloidal gear having spacers according to aspects of the disclosure.
Figure 7:
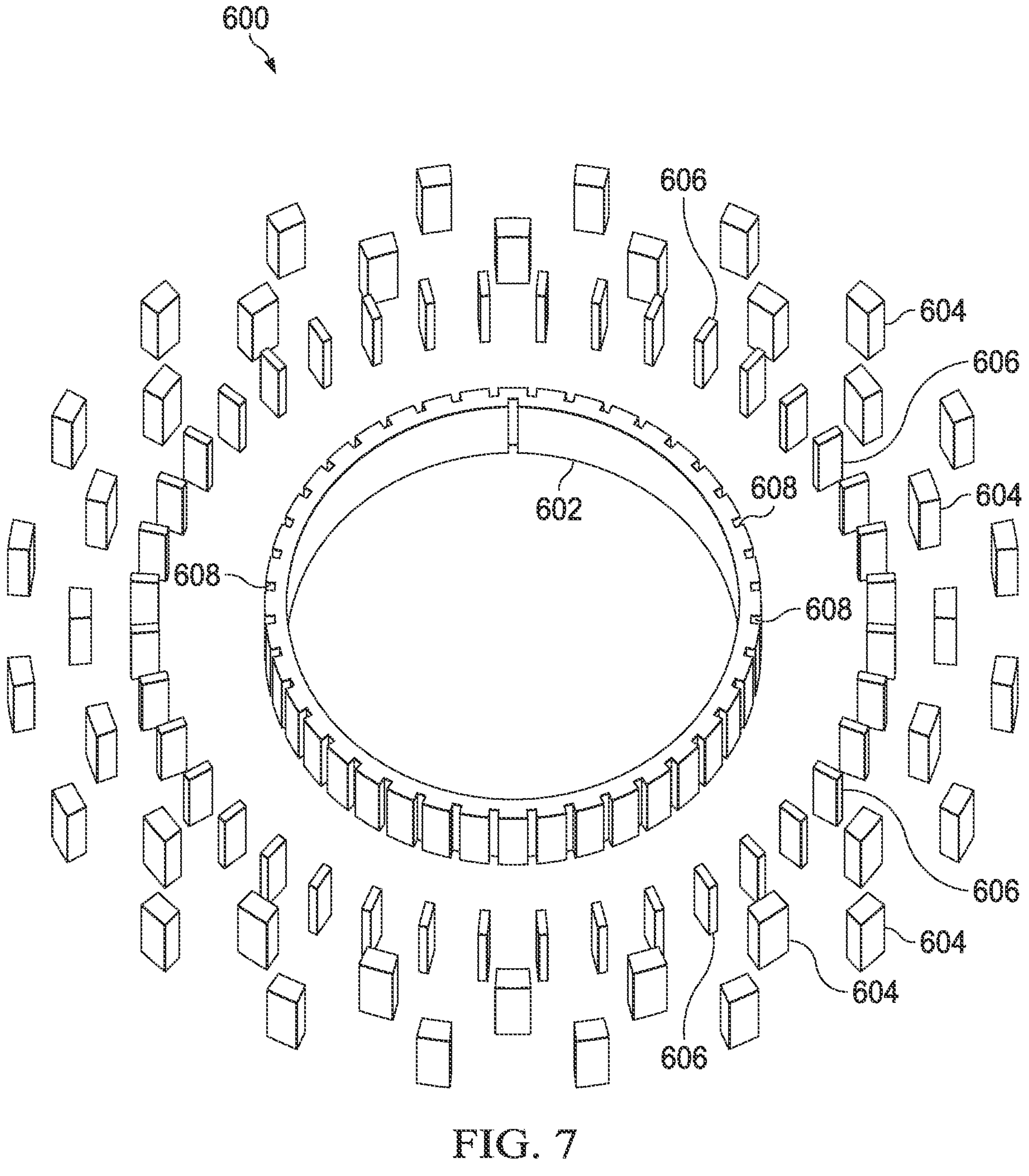
FIG. 7 is an exploded view of a cycloidal magnetic gear having spacers according to aspects of the disclosure.
Figure 8:
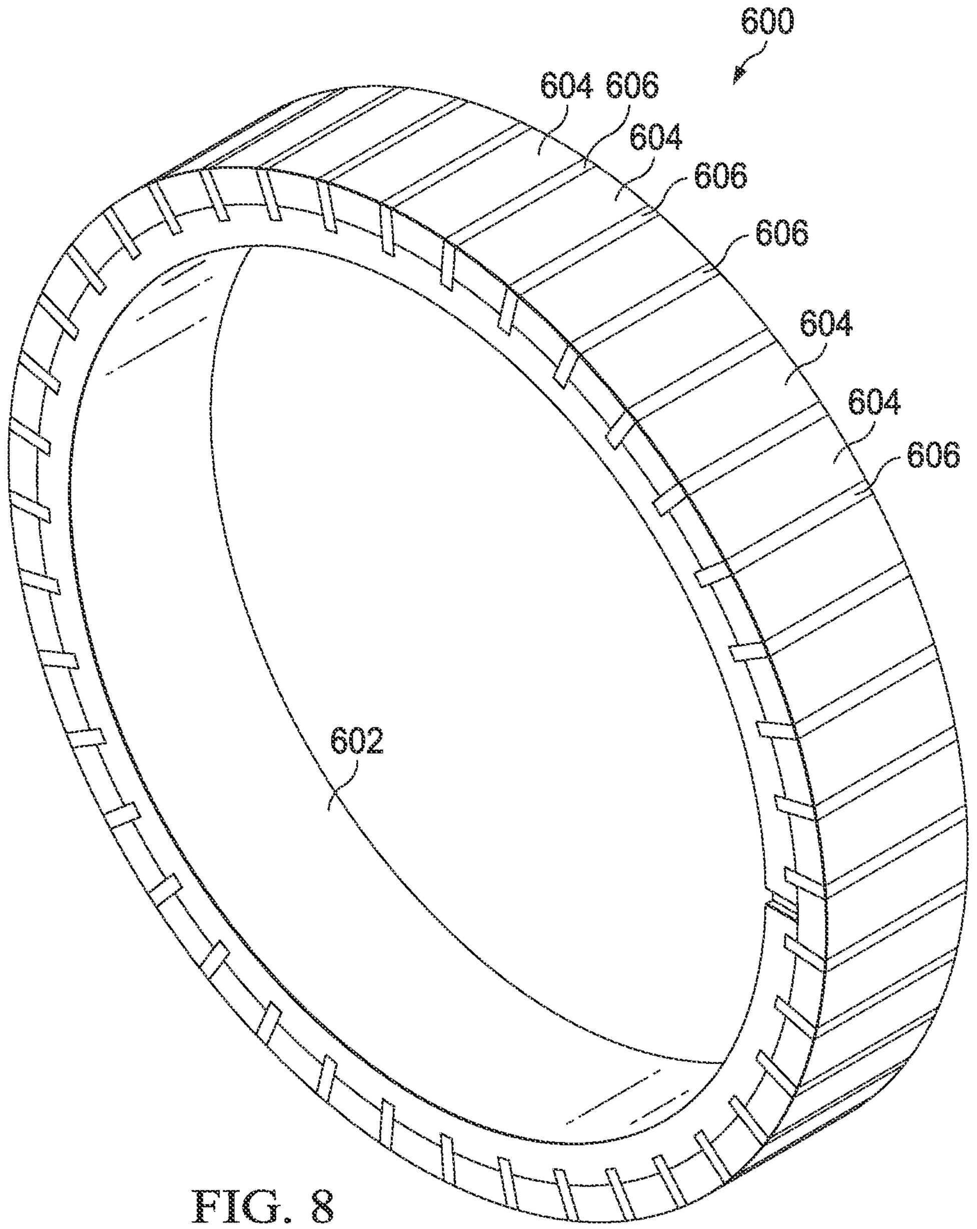
FIG. 8 is a perspective view of a cycloidal magnetic gear having spacers according to aspects of the disclosure.

FIG. 6 is a cross-sectional view of an inner rotor 600 that may be used, for example with the magnetic cycloidal gear 100. FIG. 7 is an exploded view of the inner rotor 600. FIG. 8 is a perspective view of the inner rotor 600. Referring to FIG. 6 to FIG. 8 collectively, the inner rotor 600 includes a back iron 602 and a plurality of permanent magnets 604 that are mounted to a surface of the back iron 602. A plurality of spacers 606 are disposed around the surface of the back iron 602. Each spacer of the plurality of spacers 606 is positioned between sequential magnets of the plurality of permanent magnets 604 and extends in a radial direction from the back iron 602. In various embodiments, the plurality of spacers 606 are constructed of a non-magnetic material. In various embodiments, the plurality of spacers 606 may be formed, for example, by notching the back iron 602 to create positions for each magnet of the plurality of magnets 604. Thus, in such embodiments, the spacers 606 are formed in the areas between sequential positions for each magnet of the plurality of magnets 604. In other embodiments, the plurality of spacers 606 may be formed, for example, by coupling a non-magnetic web to the back iron 602. As shown by way of example in FIG. 7, the plurality of spacers 606 may be inserted into a groove 608 formed in the back iron 602. In such embodiments, the plurality of spacers 606 may be held in place relative to the back iron 602 via a frictional engagement with the back iron 602 or via an adhesive such as, for example, epoxy. Although FIG. 6 to FIG. 8 show, by way of the example, the inner rotor 600, one skilled in the art will understand that principles of the present disclosure could also be applied to an outer rotor of a cycloidal magnetic gear. Thus, the outer rotor could also be constructed with spacers positioned between sequential permanent magnets.

Figure 9:
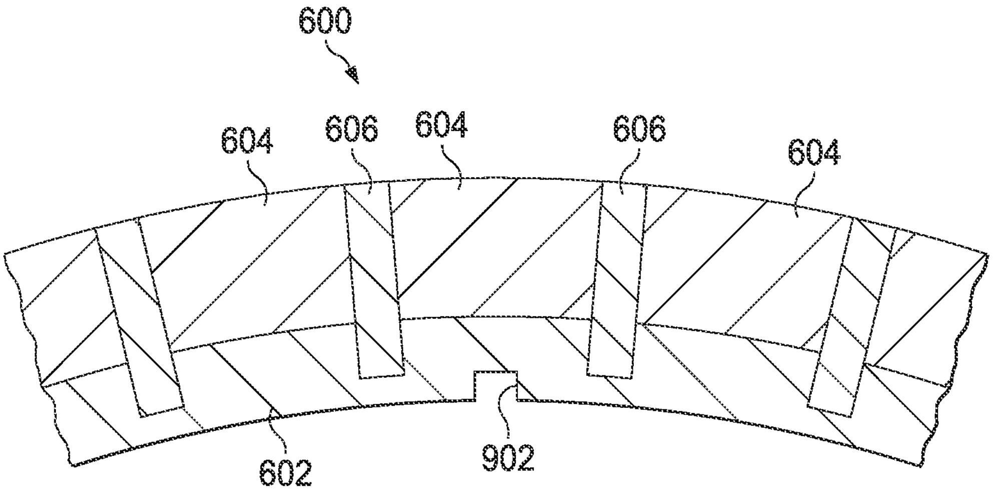
FIG. 9 is a detailed view of a of a cycloidal magnetic gear having spacers illustrating a keyway formed therein according to aspects of the disclosure.

FIG. 9 is a detailed view of a cycloidal magnetic gear 900 illustrating a keyway 902 formed therein. In magnetic gear embodiments utilizing multiple mechanically phase-shifted rotor segments, in order to maintain balance, consecutive rotors are magnetically phase-shifted with respect to each other. In order to facilitate mechanical and magnetic phase shifting during assembly, and maintain shifting during operation, aspects of the disclosure involve using the keyway 902 or splines, teeth, etc. of any kind (that makes the surface thereof nonuniform) on the inner diameter of the inner rotor back iron 602 and/or the outer diameter of the inner rotor cycloidal disc (hub) in combination. Alternatively, all magnets 604 of the same polarity may be positioned on all of the inner rotor keyway markings, but maintain the magnetic phase shift by swapping the polarities of the poles on the outer stator corresponding to each consecutive rotor. The keyway (or spline) 902 also may be used to facilitate a friction fit between the hubs and back irons 602 and removes the need of an adhesive to facilitate the transfer of torque to the inner rotor 600. In various embodiments, during the manufacture of cycloidal magnetic gears having multiple rotor segments, a single rotor may be constructed and then split along a plane that is perpendicular to the axis of rotation in order to produce multiple rotor segments with proper alignment.

Figure 10:
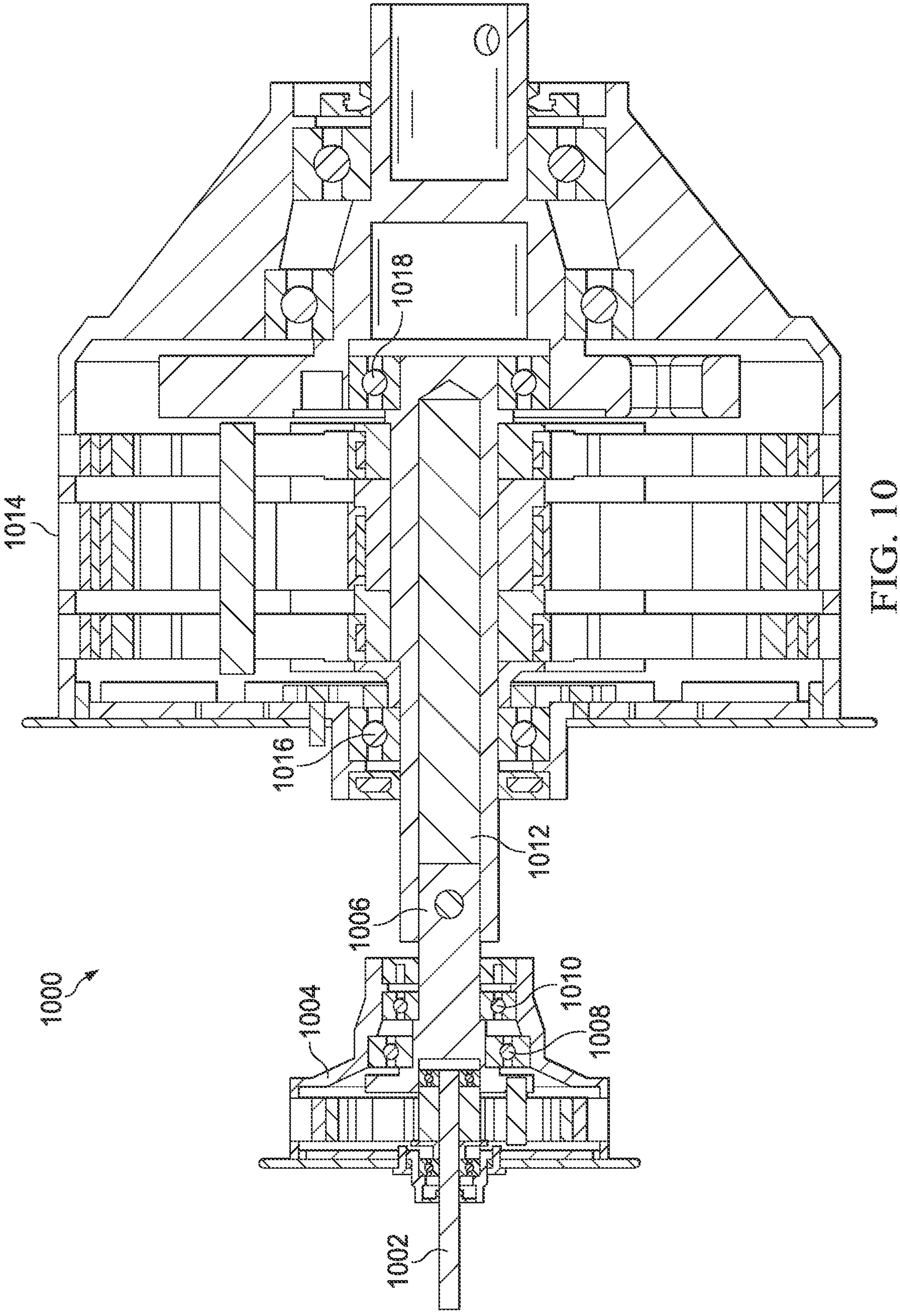
FIG. 10 is a cross-sectional view of a two-stage cycloidal magnetic gear.

FIG. 10 is a cross-sectional view of a two-stage cycloidal magnetic gear system 1000. The two-stage cycloidal magnetic gear system 1000 includes a first input shaft 1002 that is coupled to a first cycloidal magnetic gear 1004. The first cycloidal magnetic gear 1004 is coupled to a first output shaft 1006. The first output shaft 1006 is supported by a first bearing 1008 and a second bearing 1010. The first output shaft 1006 is coupled to a second input shaft 1012. The second input shaft 1012 is coupled to a second cycloidal magnetic gear 1014. The second input shaft 1012 is supported by a third bearing 1016 and a fourth bearing 1018.

Figure 11:
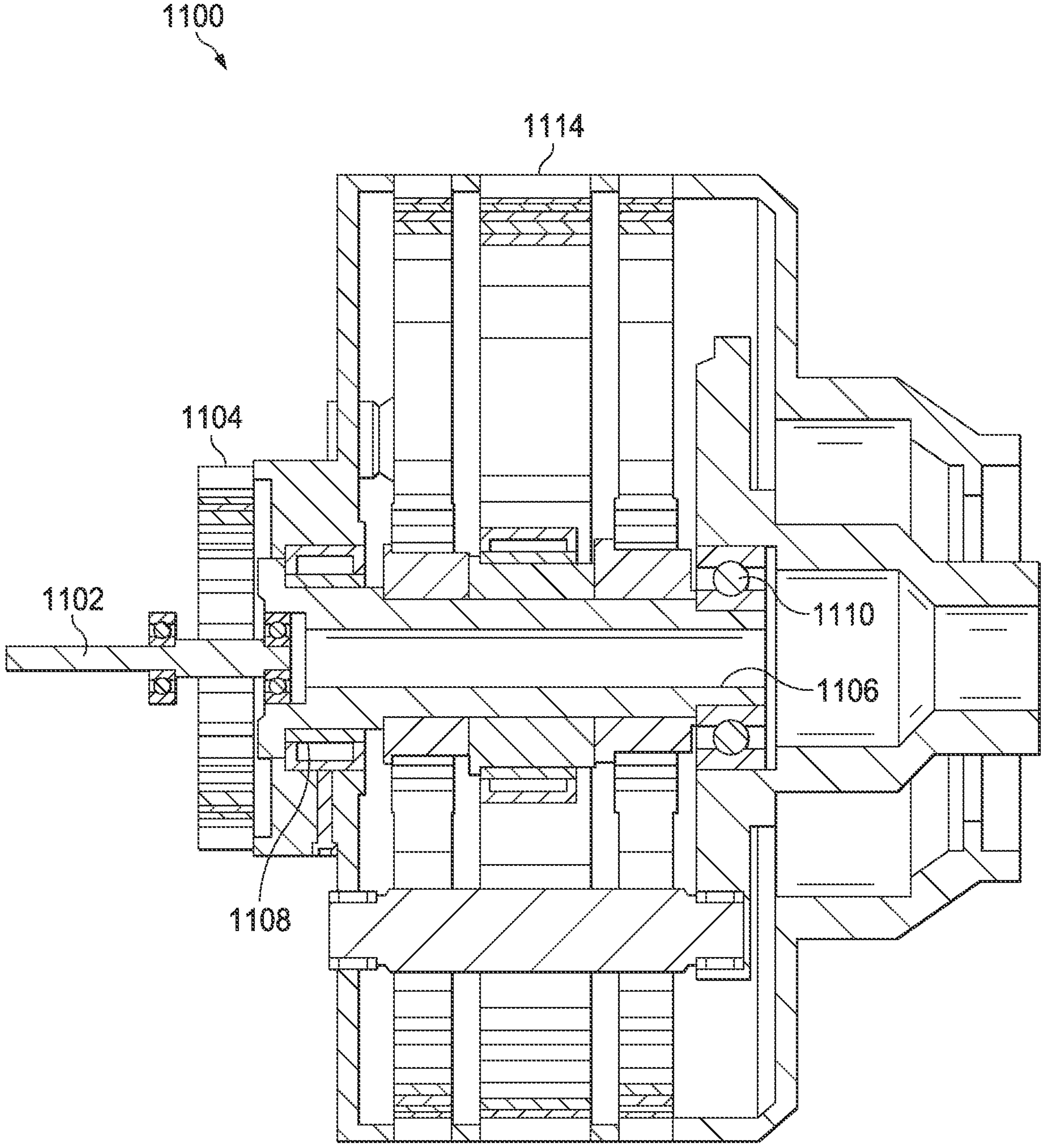
FIG. 11 is a cross-section view of a two-stage cycloidal magnetic gear according to aspects of the disclosure.

FIG. 11 is a cross-section view of a two-stage cycloidal magnetic gear system 1100. The two-stage cycloidal magnetic gear system 1100 includes a first input shaft 1102 that is coupled to a first cycloidal magnetic gear 1104. The first cycloidal magnetic gear 1104 is coupled to a first output shaft 1106. The first output shaft 1106 is supported by a first bearing 1108 and a second bearing 1110. The first output shaft 1106 is coupled to a second cycloidal magnetic gear 1114. In various embodiments, the first bearing 1108 and the second bearing 1110 could be, for example ball bearings, cylindrical roller bearings, or any other type of bearing. In various embodiments, the first cycloidal magnetic gear 1104 and the second cycloidal magnetic gear 1114 may be, for example, single rotor cycloidal gears or multiple-rotor cycloidal gears.

Figure 12A:
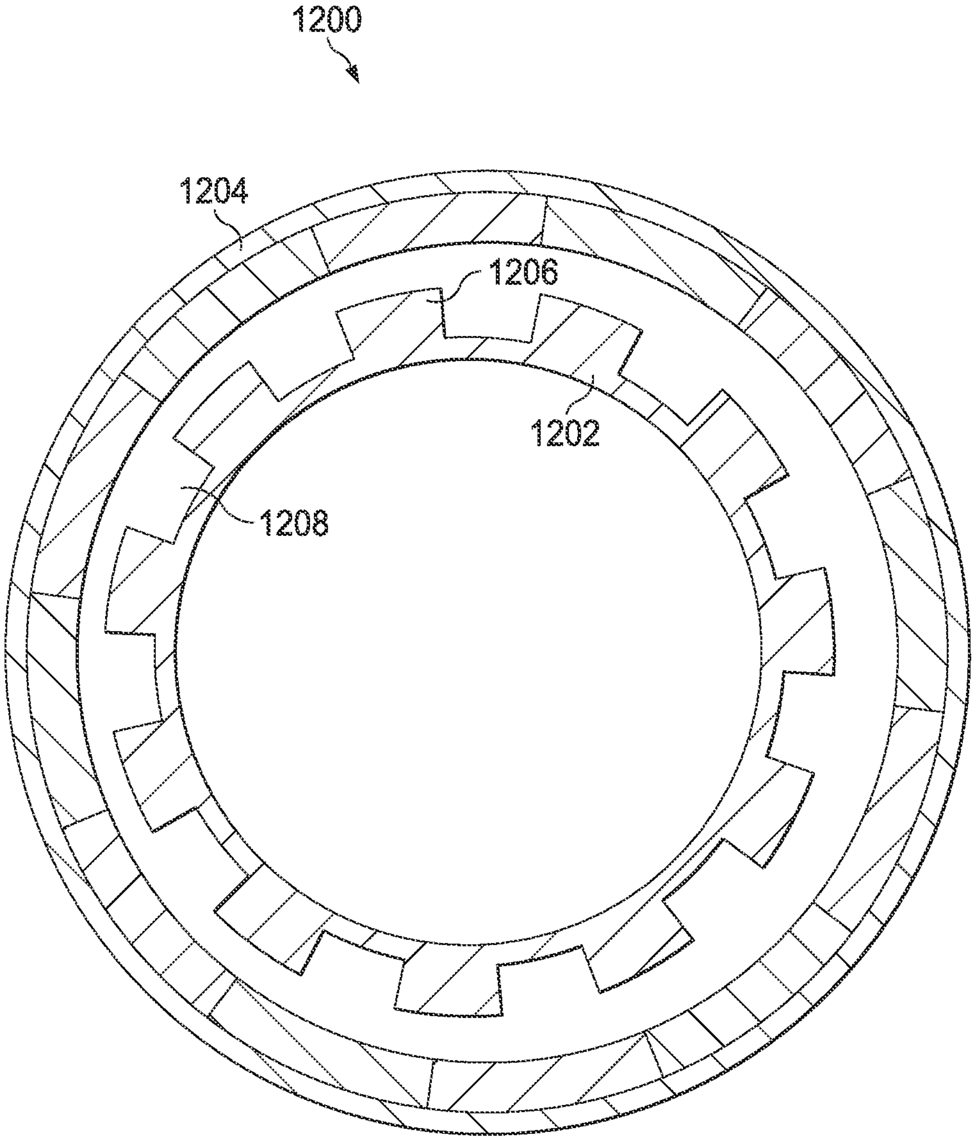
FIG. 12A is a schematic diagram of a reluctance-type cycloidal magnetic gear according to aspects of the disclosure.

FIG. 12A is a schematic diagram of a reluctance-type cycloidal magnetic gear. A reluctance type cycloidal magnetic gear 1200 in which no magnets are placed on one of the inner rotor 1202 or the outer rotor 1204. In the embodiment illustrated in FIG. 12A, the magnets on the inner rotor 1202 are replaced with teeth 1206 and slots 1208; however, in other embodiments, the magnets of the outer rotor 1204 could be replaced with teeth and slots. In various embodiments, this topology allows high gear ratios to be achieved with only about a quarter of the magnetic poles for the same gear ratio as a surface permanent magnet cycloidal design.

Figure 12B:
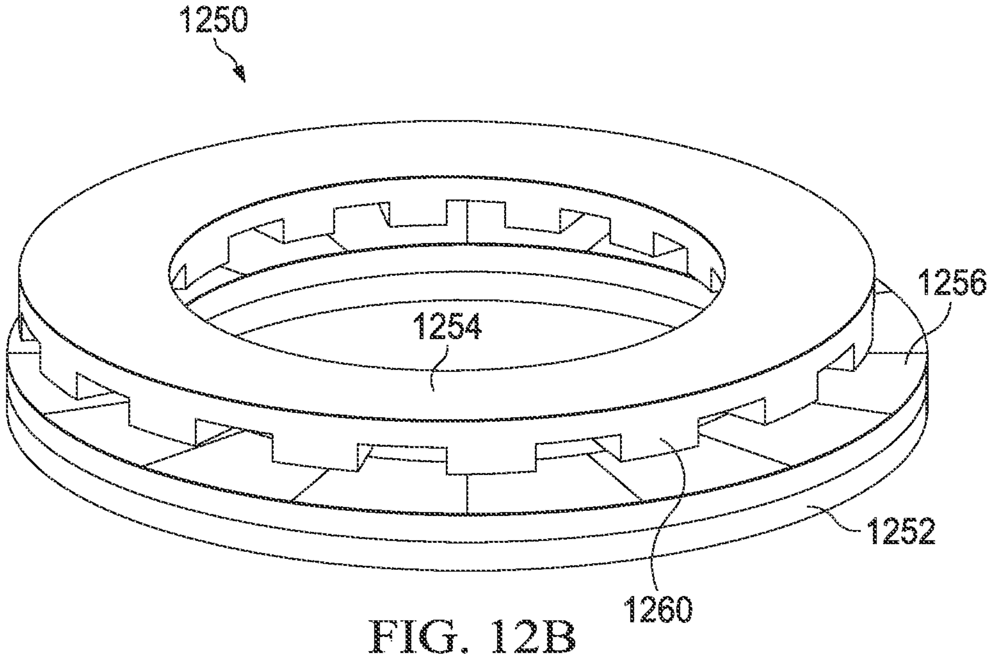
FIG. 12B is a schematic diagram of a reluctance-type cycloidal magnetic gear utilizing an axially-magnetized arrangement according to aspects of the disclosure.

FIG. 12B is a schematic diagram of a reluctance-type cycloidal magnetic gear 1250 utilizing an axially-magnetized arrangement. The cycloidal magnetic gear includes a first rotor 1252 and a second rotor 1254. A plurality of magnetic pole pairs 1256 are disposed on an axial surface of the first rotor 1252. A plurality of ferromagnetic teeth 1260 are formed on the second rotor 1254. During operation, the plurality of magnetic pole pairs 1256 influence the plurality of ferromagnetic teeth 1260 due to magnetic reluctance. The first rotor 1252 is aligned with the second rotor 1254 in an axial fashion such that the plurality of magnetic pole pairs 1256 of the first rotor 1252 interact with the plurality of ferromagnetic teeth 1260 due to magnetic flux in an axial direction relative to the first rotor 1252 and the second rotor 1254.

Figure 13:
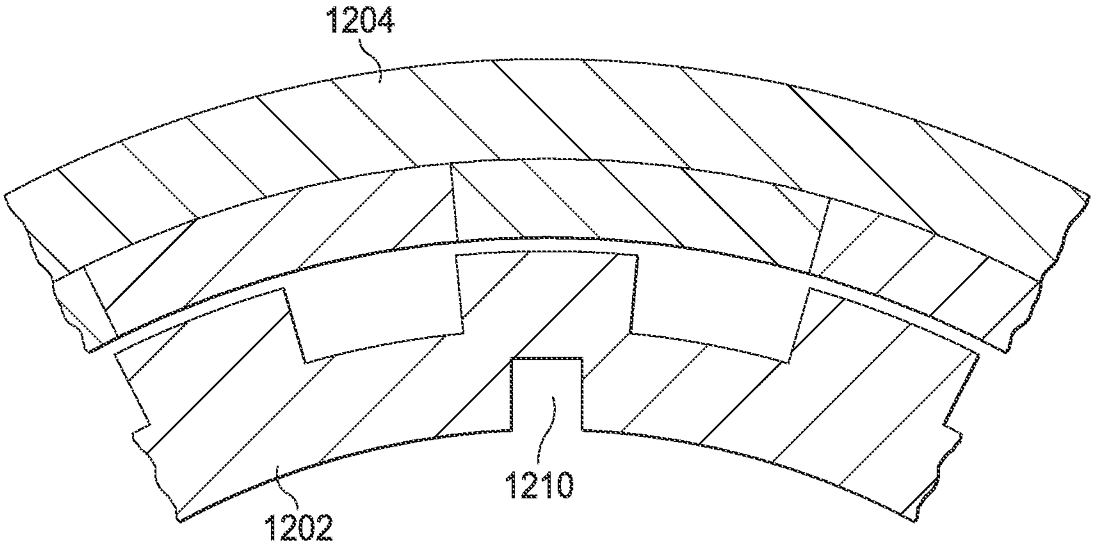
FIG. 13 is a schematic diagram of a magnetic cycloidal gear having keyways according to aspects of the disclosure.

FIG. 13 is a schematic diagram of a magnetic cycloidal gear having keyways. In FIG. 13, keyways 1210 for connecting to the inner rotor cycloidal disc (hub) to connect to the crank shaft may be placed behind teeth as shown in FIG. 13. The key is located at the thick point of the rotor to avoid creating a stress point on the rotor and to avoid interference with the magnetic flux. In other words, material is being removed from a portion of the disc that is thickest in the radial direction to minimize mechanical stress in the area of the interlock and to minimize interference with the magnetic flux.

Figure 14:
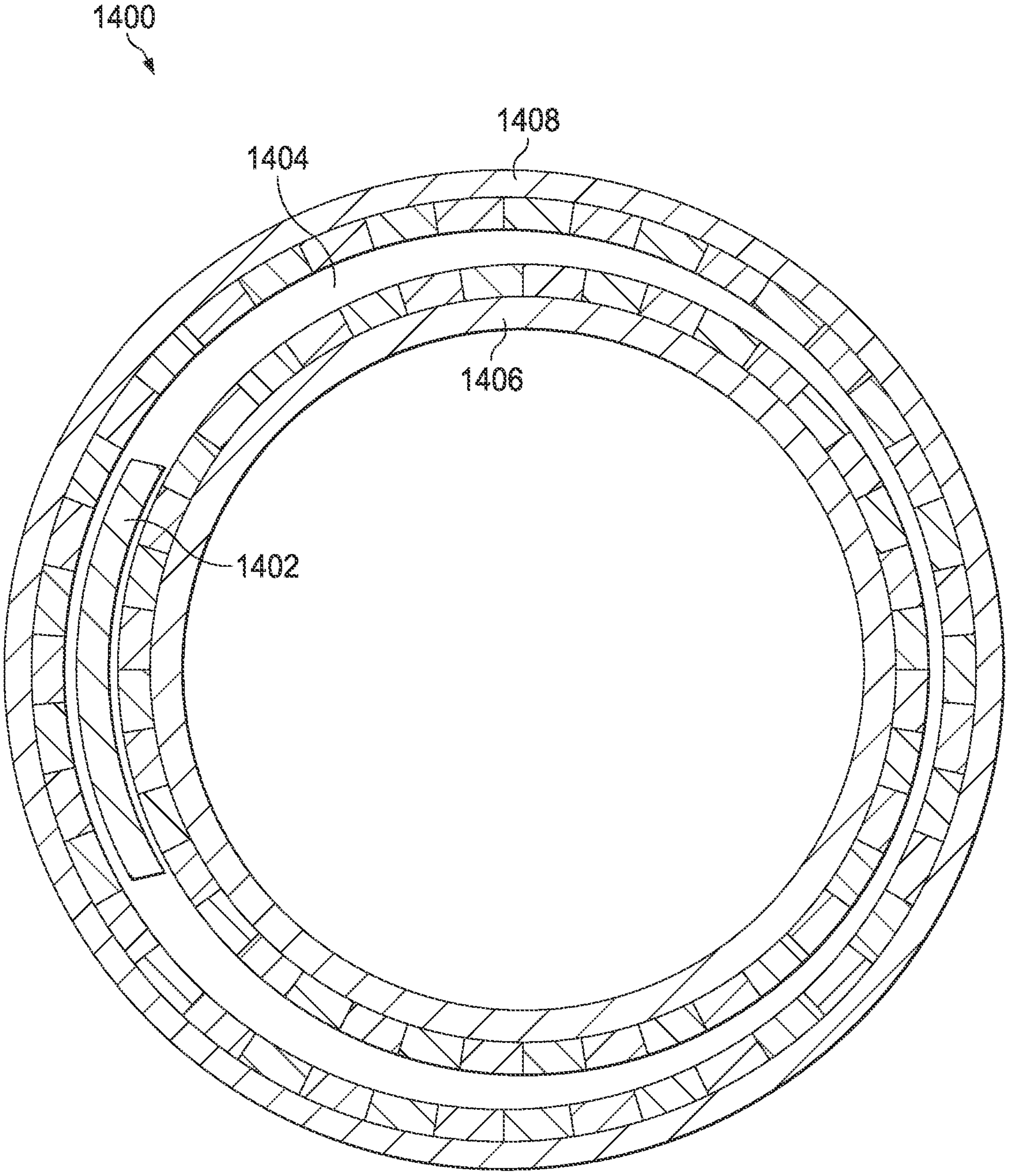
FIG. 14 is a schematic diagram of a cycloidal magnetic gear with a flux shield according to aspects of the disclosure.

FIG. 14 is a schematic diagram of a cycloidal magnetic gear 1400 with a flux shield 1402. During operation, revolution of the inner rotor 1406 about the inner circumference of the outer rotor 1408 causes the air gap 1404 between the inner rotor 1406 and the outer rotor 1408 to be of varying width. A larger air gap will be located on the side of the outer rotor 1408 opposite the point of closest interaction between the inner rotor 1406 and the outer rotor 1408. In various embodiments, the flux shield 1402 is located in the larger part of an air gap 1404 located between inner rotor 1406 and outer rotor 1408. In various embodiments, the flux shield 1402 may be radially opposite the smallest part of the air gap 1404, as shown in FIG. 14. In other embodiments, the flux shield 1402 may be offset by some angle from the point radially opposite from the smallest portion of the air gap 1404. The flux shield 1402 revolves about the primary axis of rotation at the same speed as the high-speed shaft. The flux shield 1402 is shaped so as to short circuit undesirable flux paths which may contribute to opposing torque production on the inner rotor 1406. The flux shield 1402 may also be shaped so as to reduce the radial load on the bearings of the inner rotor 1406. In various embodiments, the flux shield 1402 itself may replace the counterweight, or additional counterweighting may be used for final balancing after the inclusion of the flux shield 1402. In various embodiments, the flux shield 1402 may be utilized with various types of cycloidal magnetic gears including, for example, surface permanent magnets, consequent poles, interior permanent magnets, and reluctance-type cycloidal magnetic gears.

Figure 15:
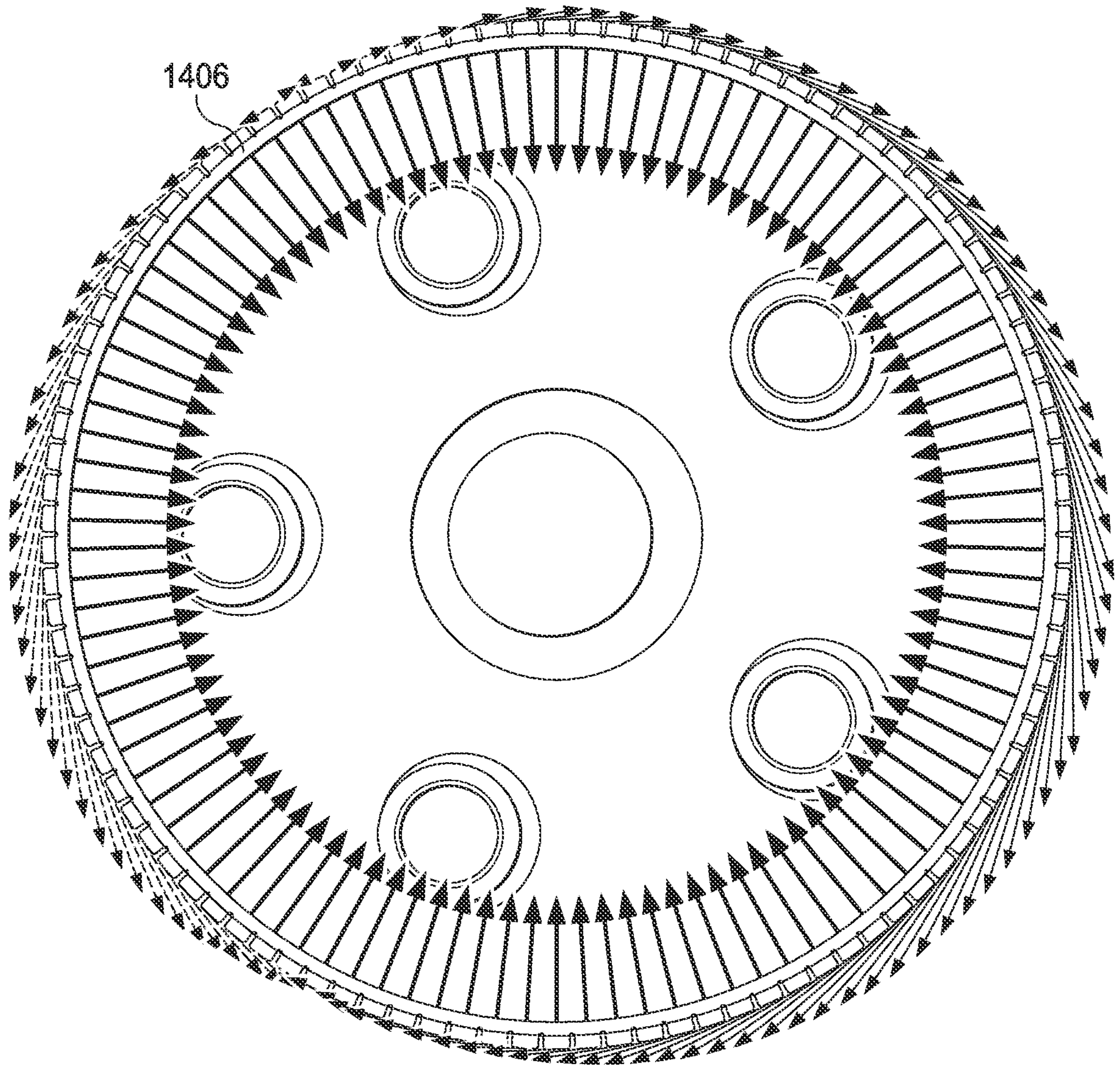
FIG. 15 is a schematic diagram showing the force distribution on the inner rotor of a cycloidal magnetic gear at a particular instant of time according to aspects of the disclosure.

FIG. 15 is a schematic diagram showing the force distribution on the inner rotor 1406 of a cycloidal magnetic gear at a particular instant of time. Magnetic interaction of the inner rotor 1406 with the outer rotor 1408 will give rise to torques acting on the inner rotor 1406. On one side of the inner rotor 1406, the torques have a positive value and act in the same direction of rotation of the inner rotor 1406. However, on an opposite side of the inner rotor 1406, the torques have a negative value and act opposite the direction of rotation of the inner rotor 1406. During operation, the flux shield 1402 cancels out oppositional forces, which produce counter-productive torque in the cycloidal magnetic gear 1400.

Figure 16:
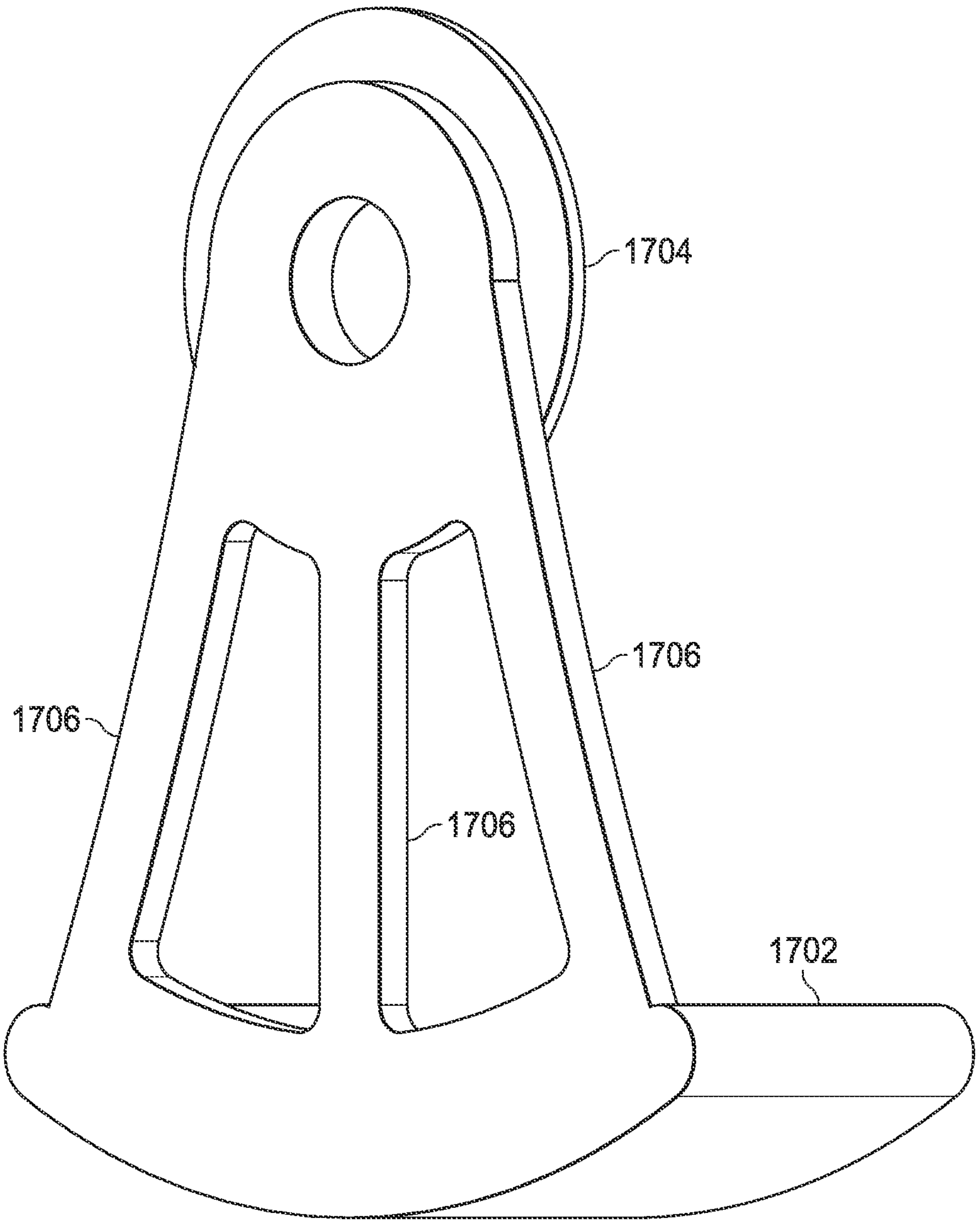
FIG. 16 is a perspective view of a flux shield with removed mass according to aspects of the disclosure.

Because the flux shield 1402 will spin at the speed of the eccentric motion of the inner rotor 1406, which is driven by the input cam shaft, the flux shield 1402, in various embodiments, can be coupled to the input cam shaft (not explicitly shown). FIG. 16 is a perspective view of a flux shield 1702 that is cantilevered from a central hub 1704 by one or more webs 1706. In various embodiments, the central hub 1704 receives an input cam shaft. As shown in FIG. 16, the flux shield 1702 may be cantilevered, but even with a small stack length, such cantilevering results in high deflection. The webs 1706 and the central hub 1704 holding the flux shield 1702 may, in various embodiments, be designed with removed (or added) mass so that the flux shield 1702 and associated structure act as a counterweight.

Figure 17:
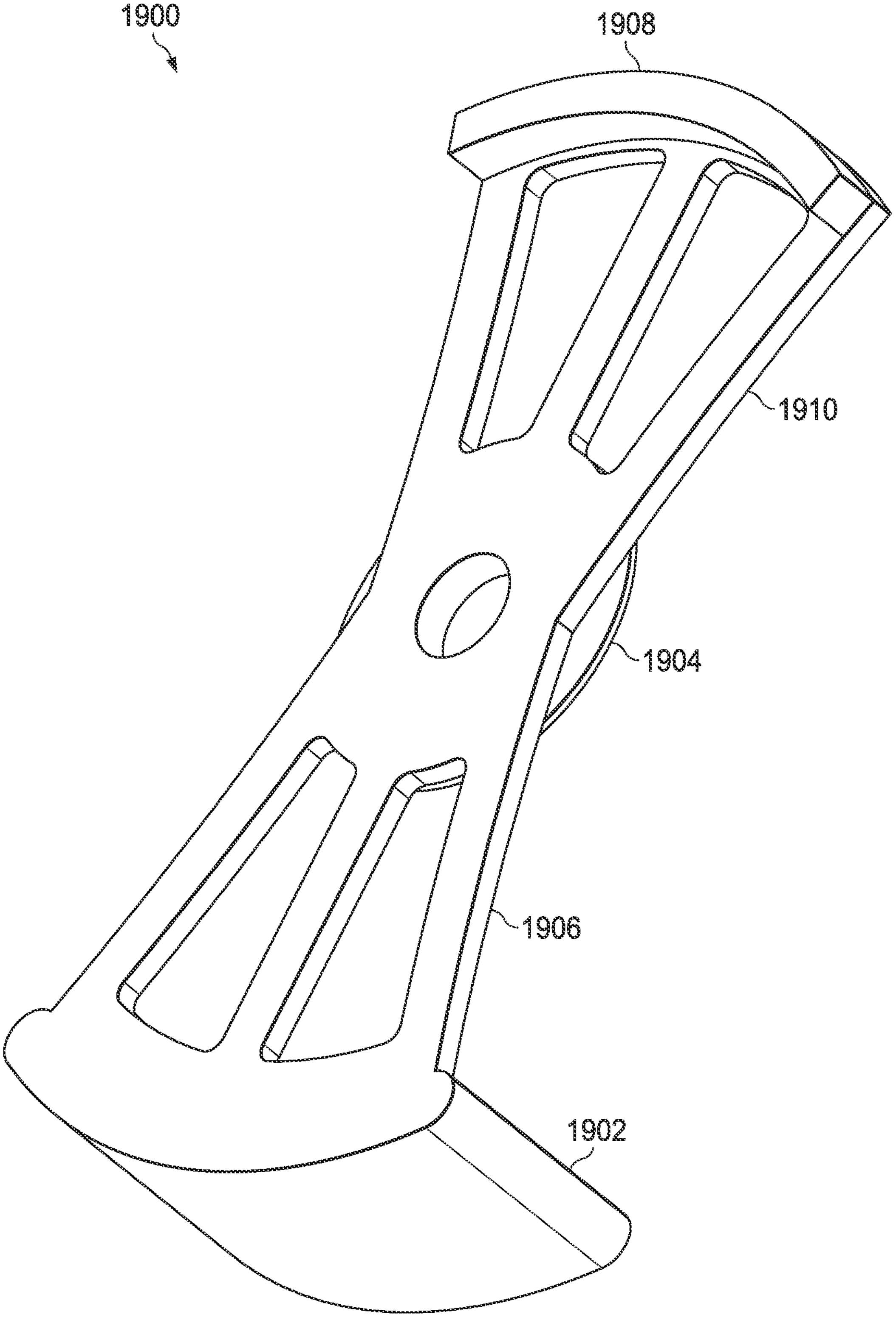
FIG. 17 is a perspective view of a flux shield with added mass according to aspects of the disclosure.

FIG. 17 is a perspective view of a flux shield assembly 1900 where mass is added to function as a counterweight. The flux shield assembly 1900 includes a flux shield 1902, which is coupled to a central hub 1904 via a first plurality of webs 1906. A counterweight 1908 is disposed on the opposite side of the central hub 1904 from the flux shield 1902. The counterweight 1908 is separated from the central hub 1904 by a second plurality of webs 1910. During operation, the counterweight 1908 balances mechanical forces exerted by the flux shield 1902 and prevents deflection of the flux shield 1902.

Figure 18A:
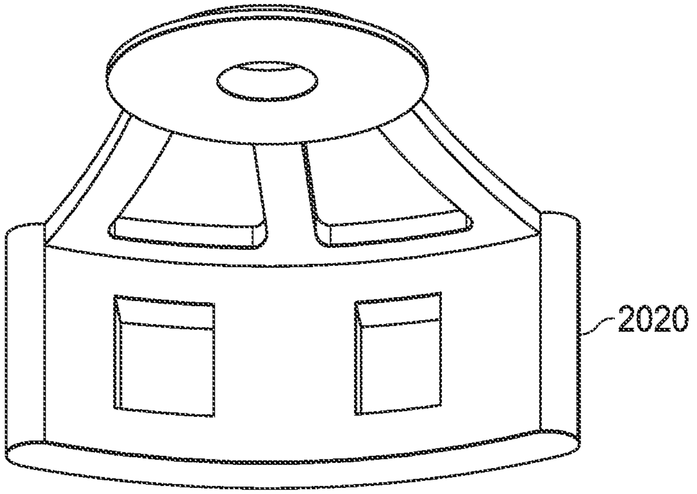
FIG. 18A is a top perspective view of a flux shield with mass removed according to aspects of the disclosure.

FIG. 18A is a perspective view of a flux shield 2020 with mass removed. The flux shield 2020 itself may, in various embodiments, not be a monolithic structure but may have mass removed in places so as to have the flux shield 2020 act as a static or dynamic counterbalance, thereby bringing the center of weight of the flux shield 2020 to the center of the input cam shaft, as discussed with respect to FIG. 18B and FIG. 18C below. The flux shield 2020 and coupling to the input shaft may, in various embodiments, be made of one solid object to increase structural integrity. However, in other embodiments, the flux shield and coupling to the input shaft may be non-integral.

Figure 18B:
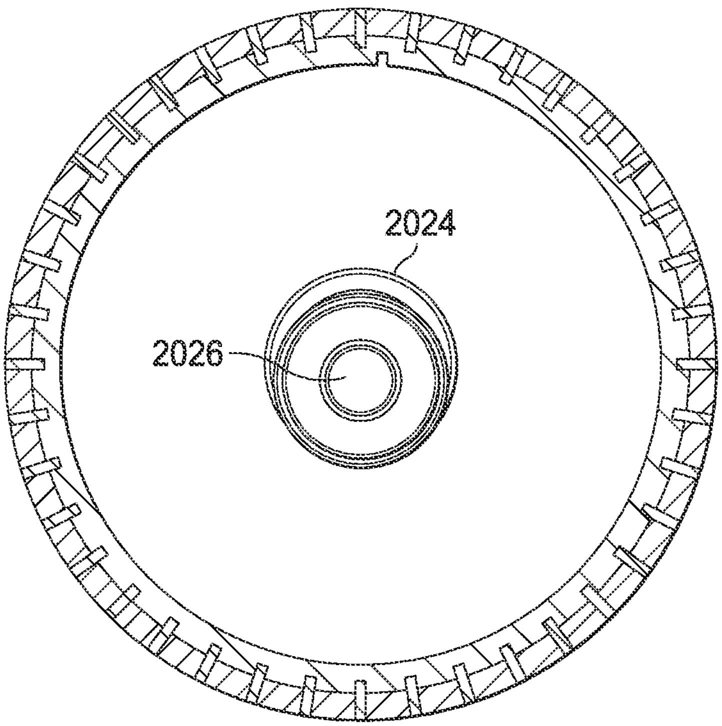
FIG. 18B is a cross-sectional view of a magnet gear with having an input shaft.
Figure 18C:
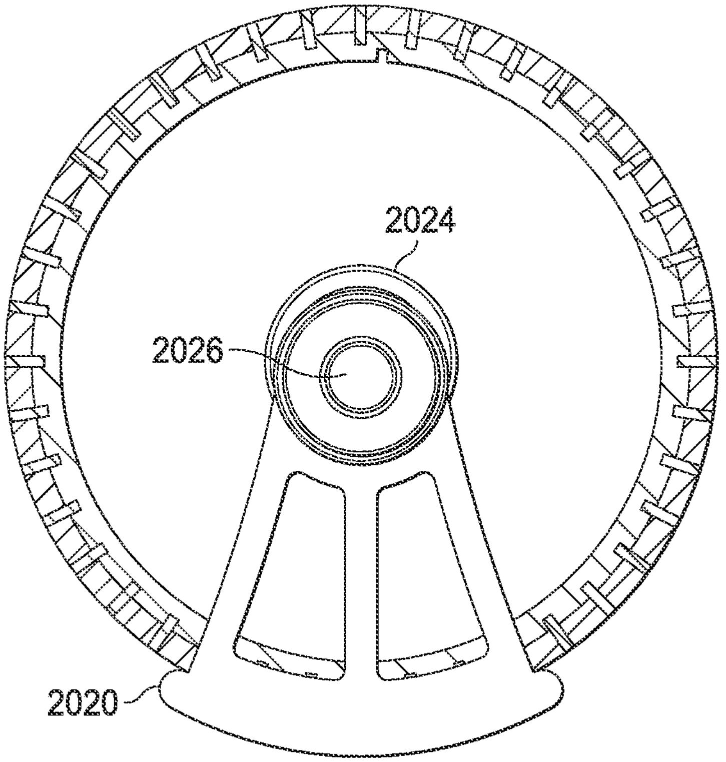
FIG. 18C is a cross-sectional view of a magnet gear with having an input shaft having a flux shield according to aspects of the disclosure.

FIG. 18B is a cross-sectional view of a magnet gear with having a shaft 2024 with a center 2026. FIG. 18C illustrates the flux shield 2020 affixed to the shaft 2024. The configuration of the magnetic gear in FIG. 18B has a center of mass that is above, or slightly above, the center 2026. When the flux shield 2020 is affixed to the shaft 2024 the center of mass is moved downward, closer to center 2026. As such, in some embodiments, the flux shield 2020 can be configured such that the center of mass is moved towards, or at, the center 2026.

Figure 19:
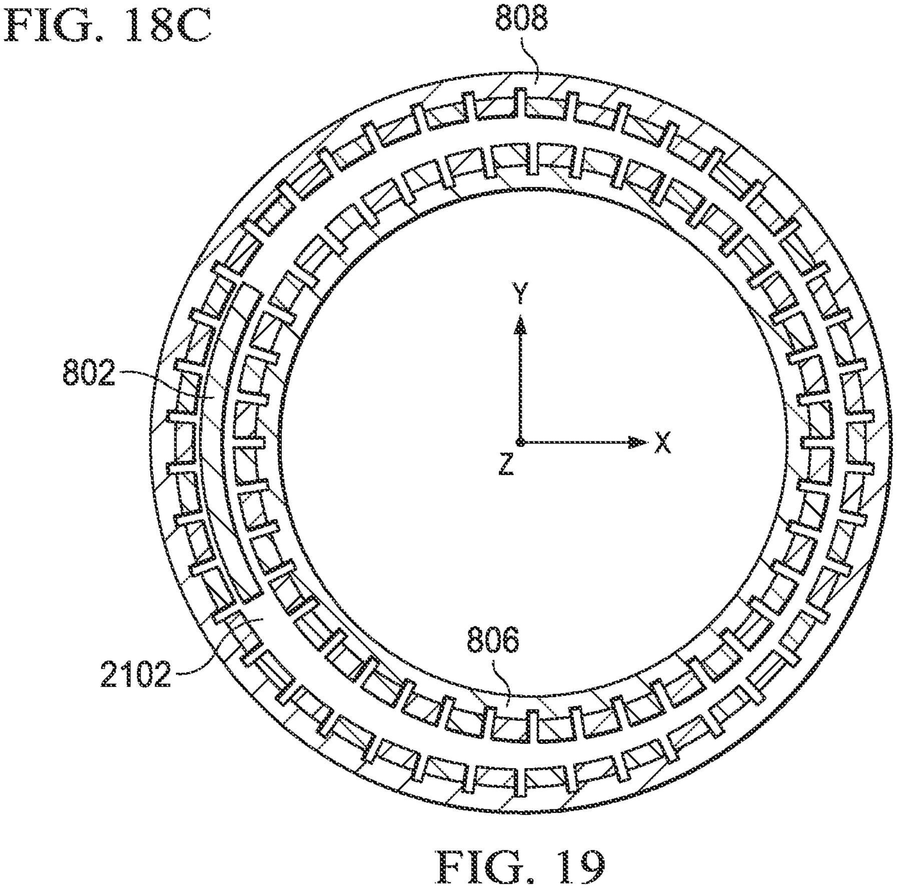
FIG. 19 is a cross-sectional view of a cycloidal magnetic gear having an offset flux shield according to aspects of the disclosure.

FIG. 19 is a cross-sectional view of a radial magnetic cycloidal gear with a flux shield 802. Because the flux shield 802 is subject to radially inward and outward forces arising from magnetic interaction of the flux shield 802 with the inner rotor 806 and the outer rotor 808, an unstable equilibrium arises. To facilitate better assembly and a more robust design, the flux shield 802 may be purposefully offset in the larger air gap 2102, being either purposefully closer to the outer rotor 808 or purposefully closer to the inner rotor 806. By being purposefully closer to either rotor, the flux shield 802 may be subject to large unbalanced forces. In various embodiments, such unbalanced forces can be leveraged by having the flux shield 802 interface a bushing or bearing or ensure good contact. The flux shield 802 or the output pin disc (not explicitly shown) may, in various embodiments, be, for example, anodized, hardened, or possess bushings to facilitate smoother sliding.

Figure 20:
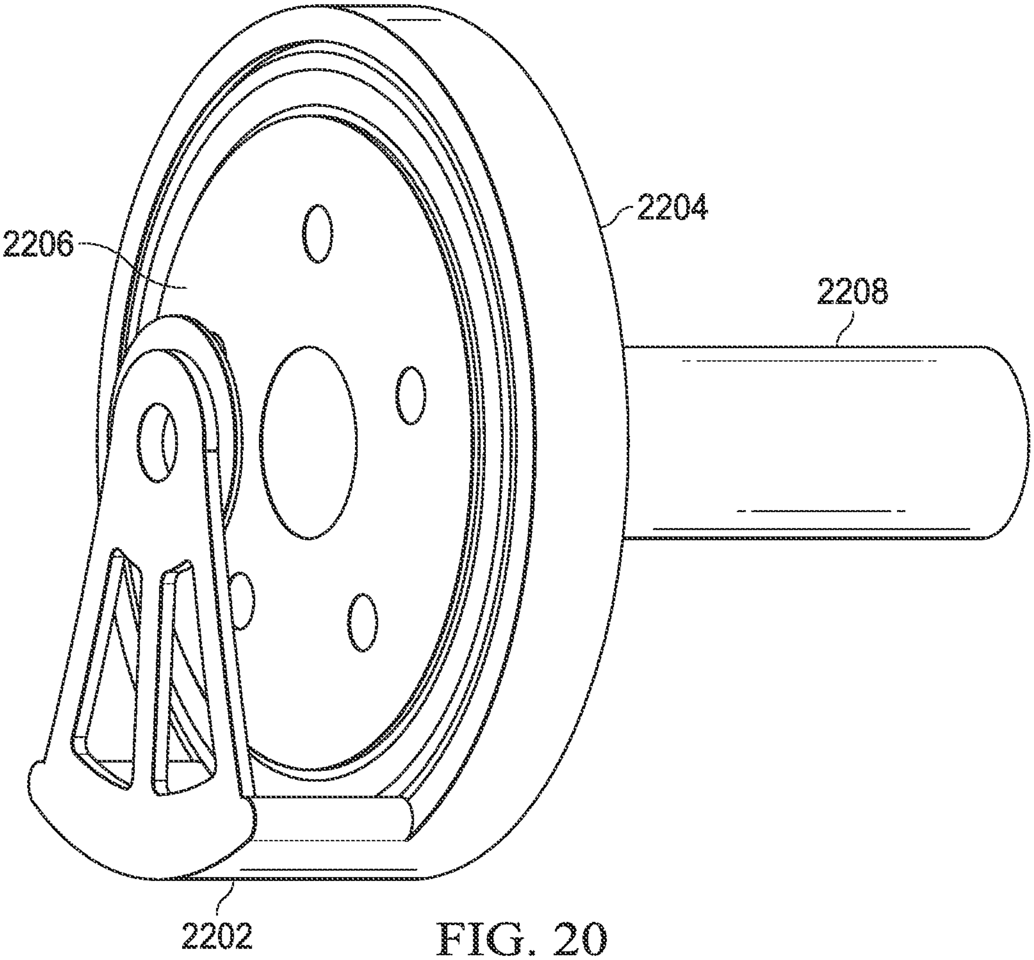
FIG. 20 is a perspective view of a flux shield engaged with an output pin disc according to aspects of the disclosure.

FIG. 20 is a perspective view of a flux shield 2202 engaging a bearing-grabbing structure 2204 on the low-speed shaft pin disc 2206 on the low-speed shaft 2208. In various embodiments, the flux shield 2202 could also rest partially on the bearing-grabbing structure 2204. In various embodiments, the flux shield 2202 may also be on a bearing on the low-speed shaft or housing, as opposed to on a large bearing on the low-speed shaft pin disc 2206. Such an arrangement would couple the flux shield 2202 to the high-speed cam shaft, and allow the flux shield 2202 to have a second interface with the low-speed shaft 2208 via a bearing or bushing, since the components rotate at different speeds or with the housing via bearing or bushing. In this case, the flux shield 2202 may, in various embodiments, be purposefully offset closer to the inner rotor 806 to facilitate placement on the low-speed shaft 2208. Alternatively, the flux shield 2202 may be coupled to the input shaft, and be purposefully offset closer to the outer rotor, and have a bearing or bushing attachment connected to the outer rotor. Such an arrangement is useful in embodiments where the inner rotor is stationary about its own axis, and the outer rotor rotates, if the outer rotor already requires bushings/bearings. In some embodiments, there are typically bearings on the low-speed shaft 2208 and not on the low-speed shaft pin disc 2206. In this arrangement, flux essentially reaches past the low-speed pin disc 2206, and grabs a bearing on low-speed shaft 2208.

While this particular embodiment describes a low-speed shaft pin disc 2206, a low-speed shaft 2208, and a high-speed cam shaft, it should be understood by those of ordinary skill in the art that an input shaft (and associated components) can be a high-speed shaft (and associated components) and a low-speed shaft (and associated components) can be and output shaft (and associated components). As such, as used herein, input can be substituted for high-speed (e.g. an input shaft can be a high-speed shaft) and output can be substituted for low-speed (e.g. an output shaft can be a low-speed shaft). This terminology can be interchanged throughout the disclosures where various applications require the input components to be high-speed components or the output components to be low-speed components.

Figure 21:
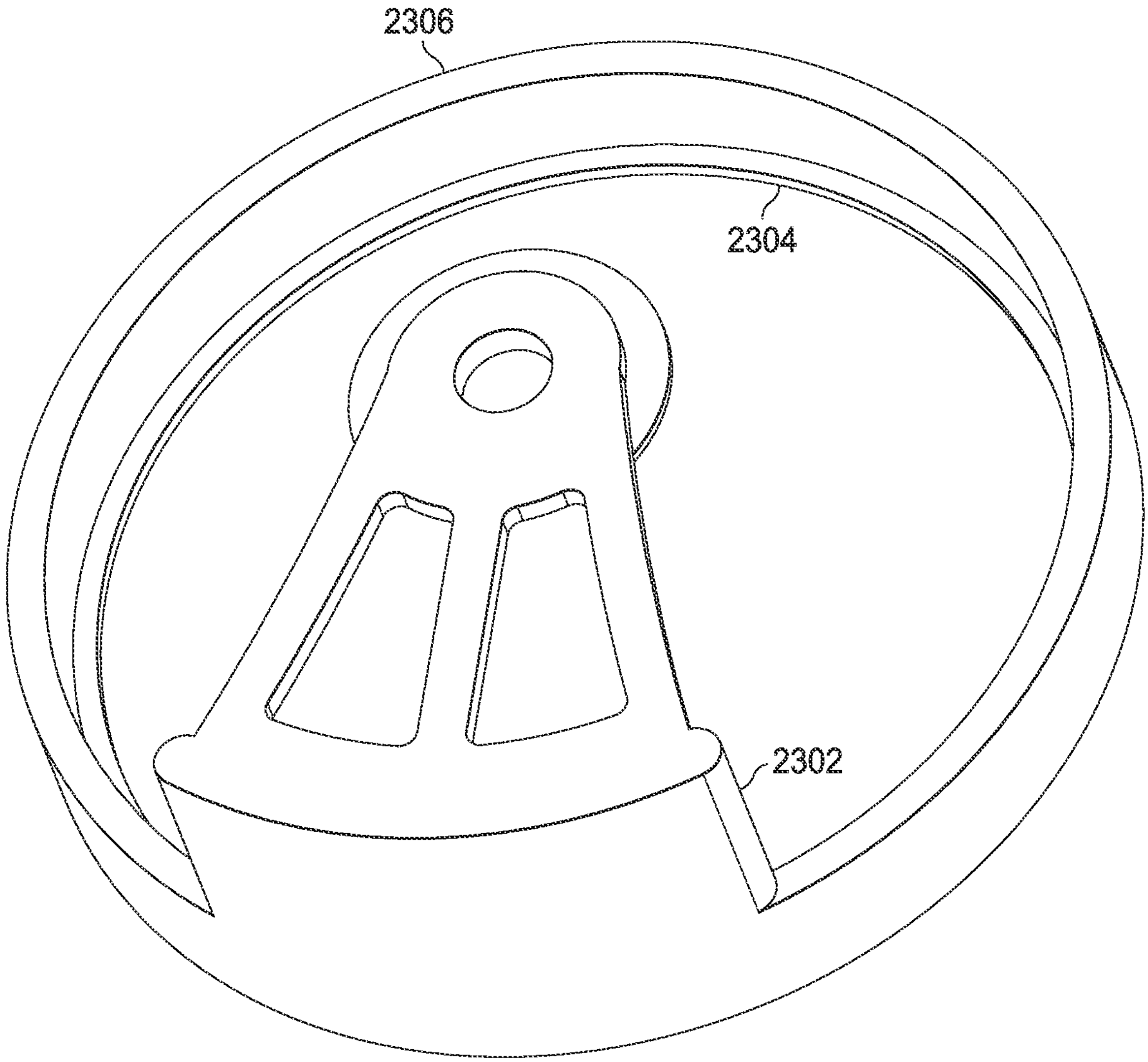
FIG. 21 is a perspective view of a flux shield having a bearing with a lip according to aspects of the disclosure.

FIG. 21 is a perspective view of a flux shield 2302 having a bearing lip 2304. In various embodiments, there are at least two locations where the flux shield 2302 could be affixed. The first location may be via the coupling of the flux shield 2302 on the input shaft. The second location may, in various embodiments, use a feature for axial alignment on a second point of contact. Such an arrangement could, in various embodiments, utilize, for example, a flange or lip 2304 on the bearing 2306 or bushing on the inner or outer rotor. In order to have this kind of lip, the apparatus for the flux shield 2302 is at least two parts.

Figure 22:
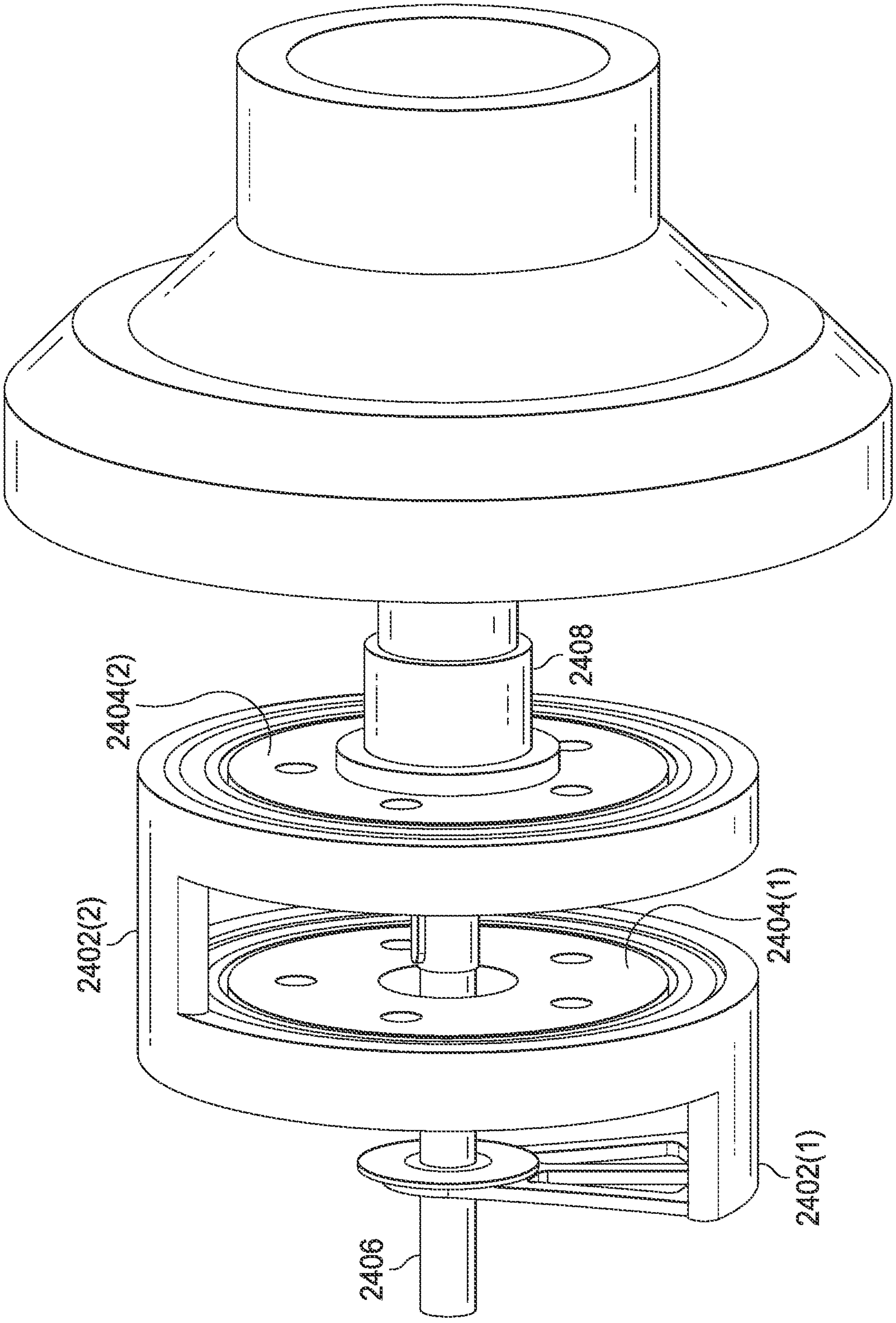
FIG. 22 is a perspective view of a system of multiple flux shields and pin discs according to aspects of the disclosure.

FIG. 22 is a perspective view of a system of multiple flux shields 2402(1)-(2) and pin discs 2404(1)-(2). In the case of cycloidal magnetic gears with long stack length, having multiple pin discs 2404(1)-(2) so as to not cantilever the pins for such a great length may be advantageous. In various embodiments, the outer diameter of the pin discs 2402(1)-(2) may have large thin section bearings are similar. In this case, the length of a single flux shield 2402(1)-(2) body may be reduced, for example, by mechanically phase shifting the flux shield 2402(1)-(2) after each pin disc section. An example with two pin discs 2404(1)-(2) and two flux shields 2402(1)-(2) is shown; however, in other embodiments, any number of pin discs and flux shields could be utilized.

For however many numbers of pin discs are used, the flux shield 2402(1)-(2) may be closer to the inner rotor than the outer rotor so as to have the flux shield 2402(1)-(2) have forces pointing radially inward. Then, as the cycloidal gear operates, and the centrifugal force on the flux shield 2402 (1)-(2) increases, the flux shield 2402(1)-(2) may still be magnetically attracted inward so as to preload and rest on the bearing 2408 better.

Figure 23:
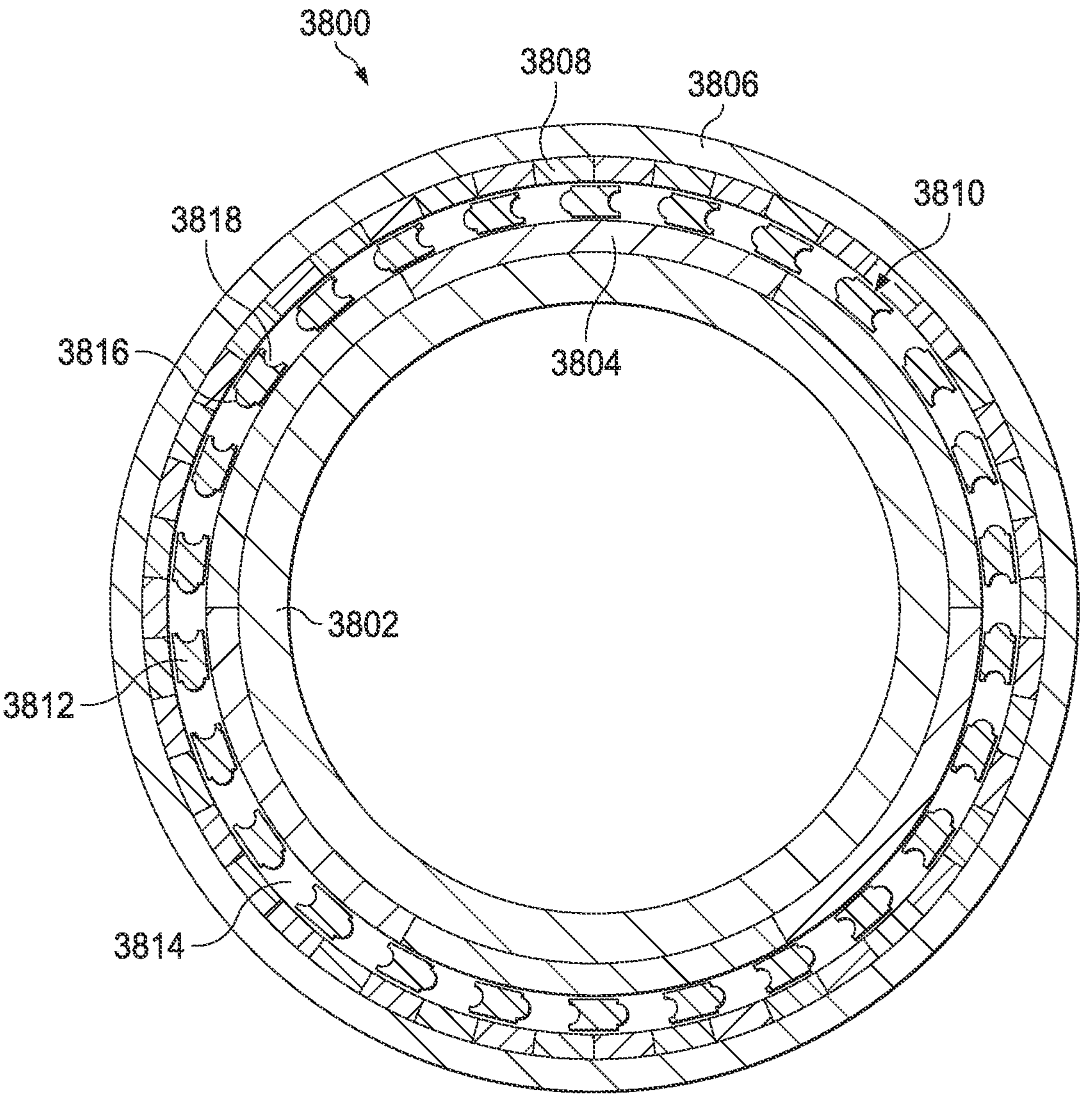
FIG. 23 is a cross-sectional view of a concentric gear system having an interlocking modulator according to aspects of the disclosure.

FIG. 23 is a cross-sectional view of a concentric gear system 3800. The concentric gear system 3800 includes an inner back iron 3802 having a first plurality of magnetic pole pairs 3804 disposed on an outer circumference thereof. The inner back iron 3802 and the first plurality of magnetic pole pairs 3804 are disposed within an outer back iron 3806. The outer back iron 3806 has a second plurality of magnetic pole pairs 3808 disposed on an inner circumference thereof. A modulator 3810 is disposed between the first plurality of magnetic pole pairs 3804 and the second plurality of magnetic pole pairs 3808.

Still referring to FIG. 23, the modulator 3810 includes a plurality of magnetically permeable segments 3812 that are arranged in an alternating fashion with a plurality of non-magnetic segments 3814. Thus, each magnetically permeable segment of the plurality of magnetically permeable segments 3812 is disposed between consecutive non-magnetic segments of the plurality of non-magnetic segments 3814. In various embodiments, each magnetically permeable segment of the plurality of magnetically permeable segments 3812 and each non-magnetic segment of the plurality of non-magnetic segments 3814 are formed with a protrusion 3816 extending outwardly from a first end and an indentation 3818 extending inwardly from a second end. In various embodiments, the protrusion 3816 and the indentation 3818 facilitate coupling of the plurality of magnetically permeable segments 3812 with the plurality of non-magnetic segments 3814. In various embodiments, such an arrangement facilitates ease of assembly of the modulator 3810. Additionally, the plurality of magnetic segments 3812 and the plurality of non-magnetic segments 3814 prevents choking of magnetic flux and prevents the formation of a short flux leakage path between segments of the modulator 3810.

Figure 24A:
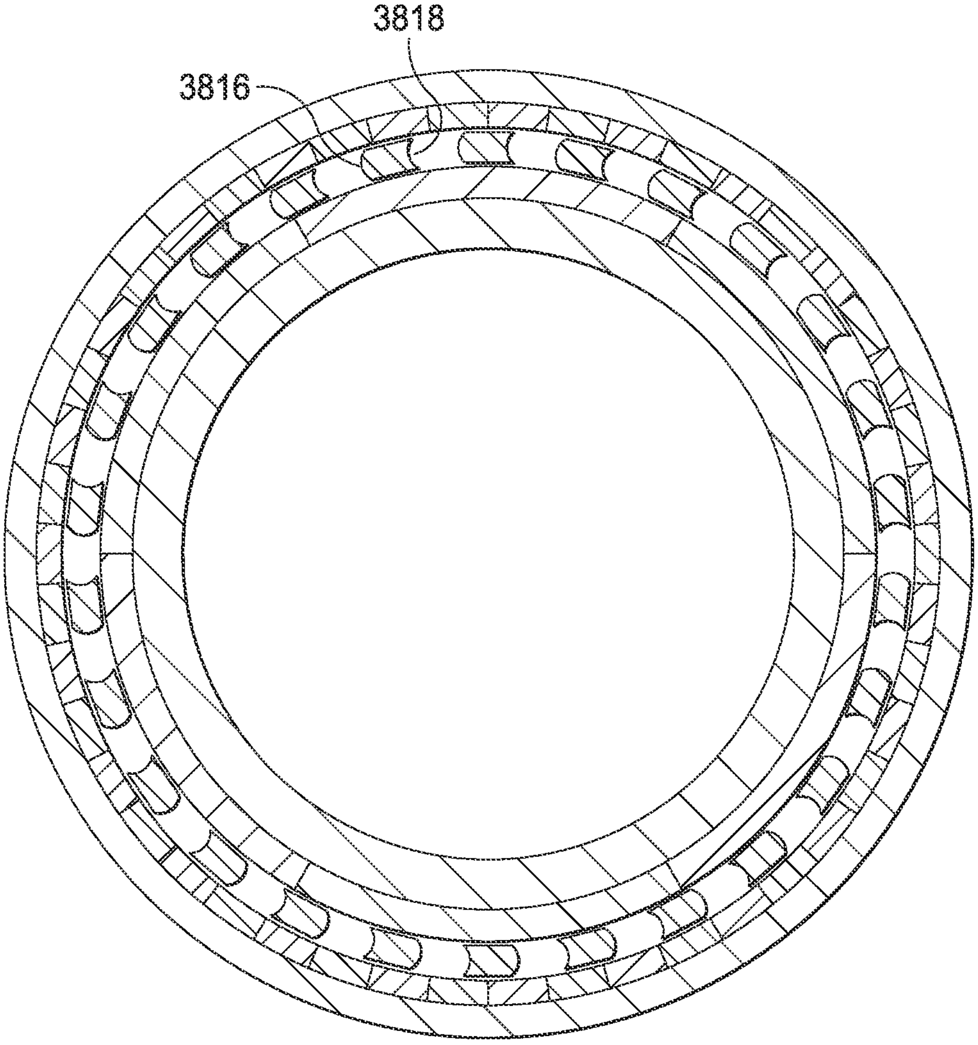
FIGS. 24A-24D are cross sectional views of concentric gears having a variety of modulator segment shapes according to aspects of the disclosure.
Figure 24B:
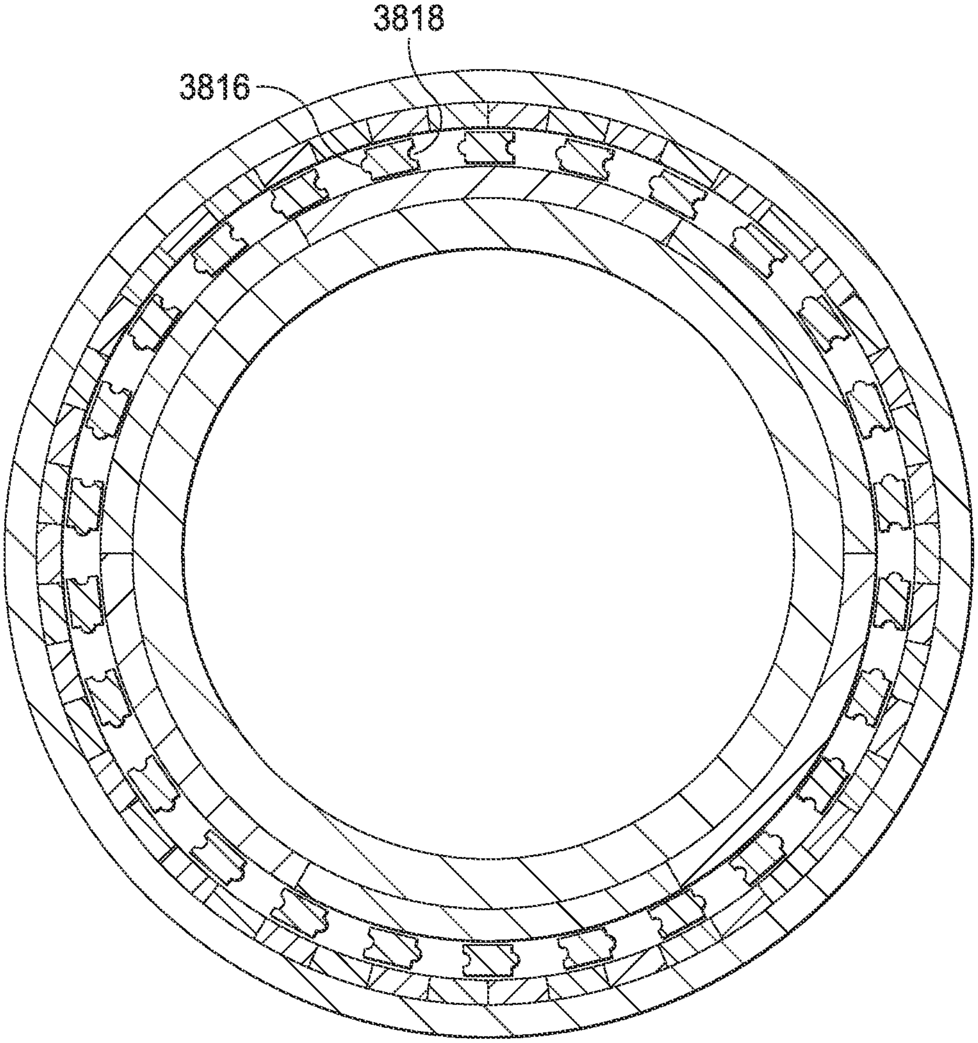
Figure 24C:
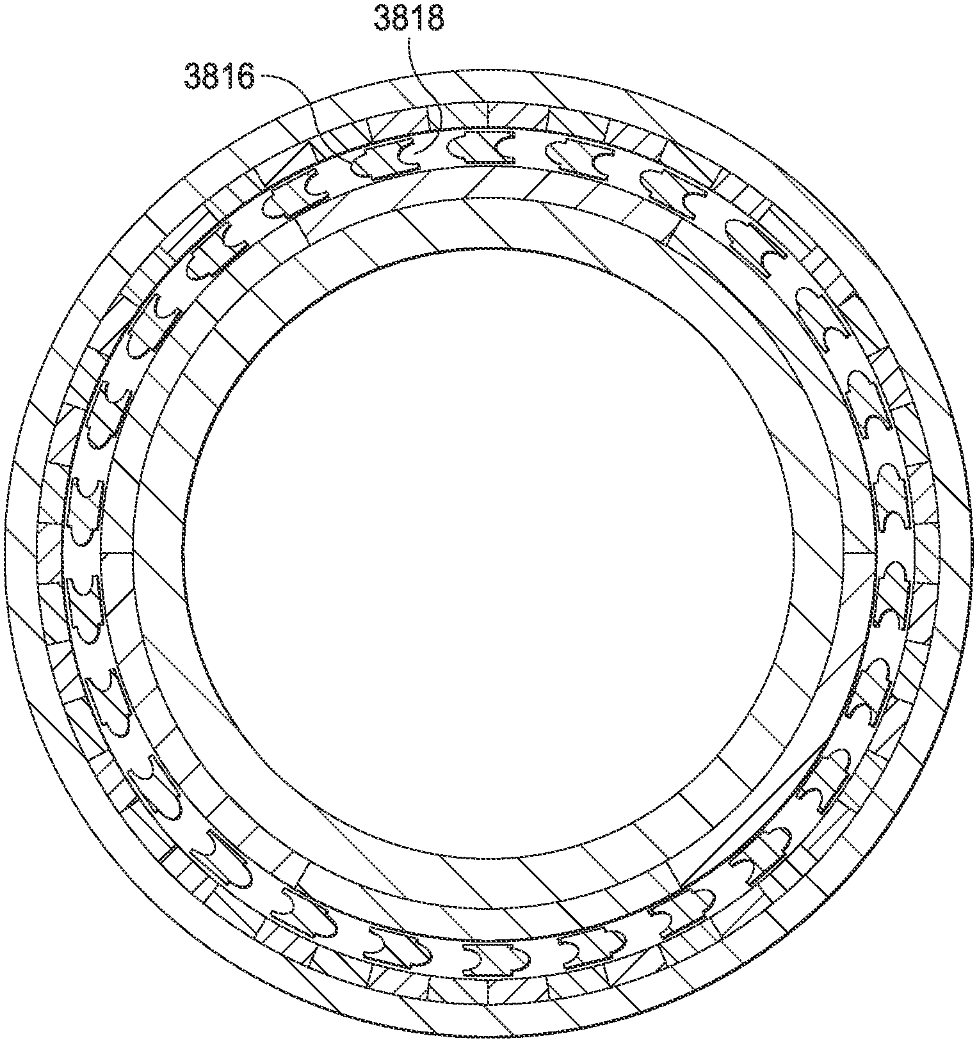
Figure 24D:
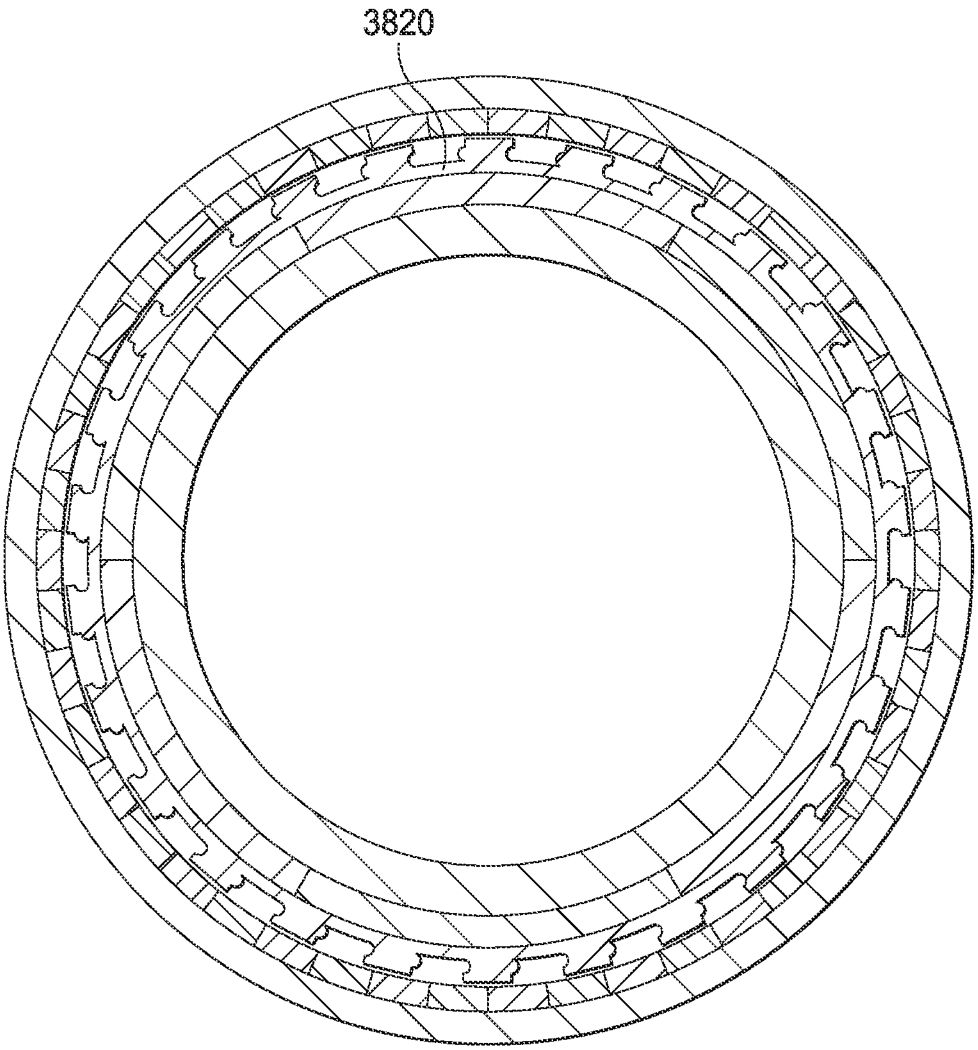

In various embodiments, the protrusion 3816 and the indentation may have a variety of shapes. FIG. 24A illustrates that the protrusion 3816 and the indentation 3818 may extend an entire radial length of a segment of the modulator 3810. FIG. 24B illustrates that the protrusion 3816 and the indentation 3818 may extend a partial radial length of a segment of the modulator 3810. FIG. 24C illustrates that the protrusion 3816 and the indentation 3818 may have an elliptical shape. FIG. 24D illustrates that the protrusion 3816 and the indentation 3818 may be utilized in conjunction with other support mechanisms such as, for example, a bridge 3820.

Figure 25A:
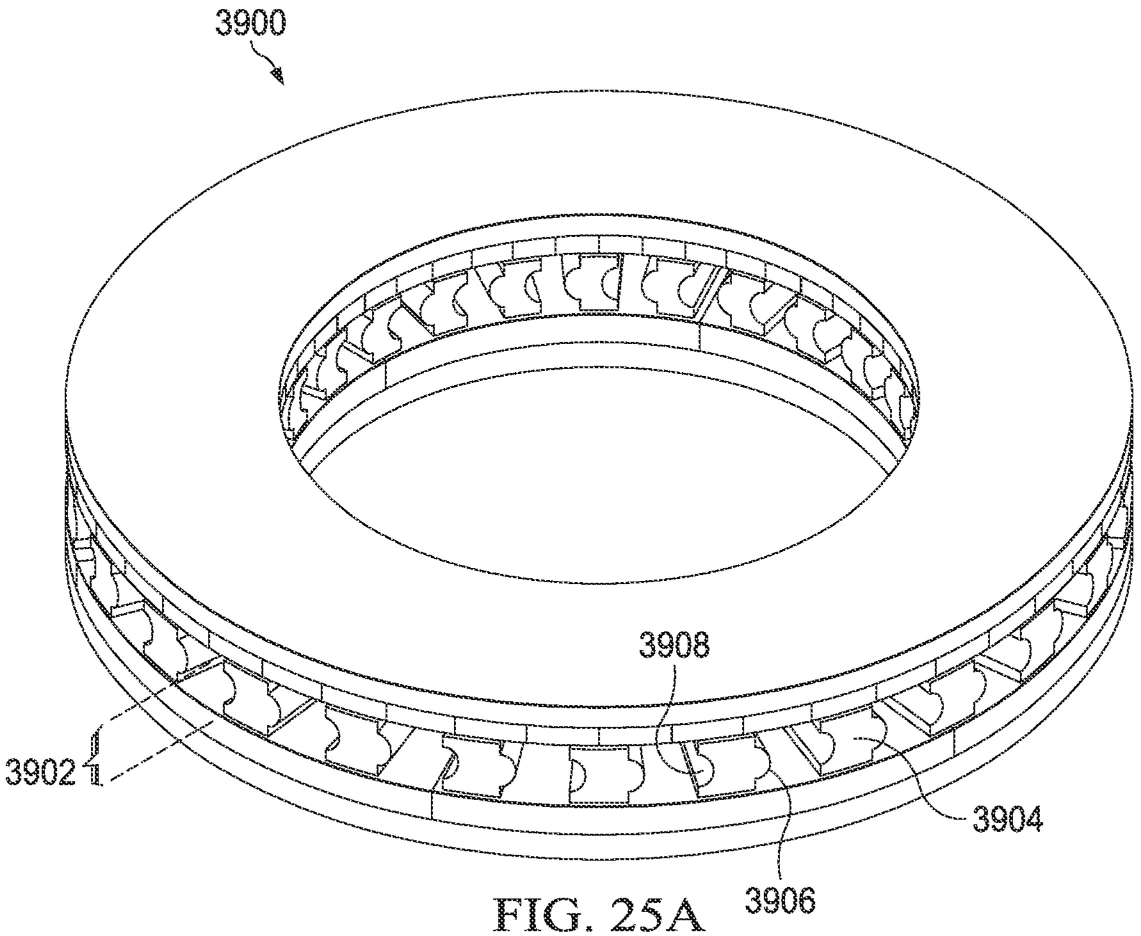
FIG. 25A is a perspective view of an axial flux magnetic gear having a segmented modulator according to aspects of the disclosure.
Figure 25B:
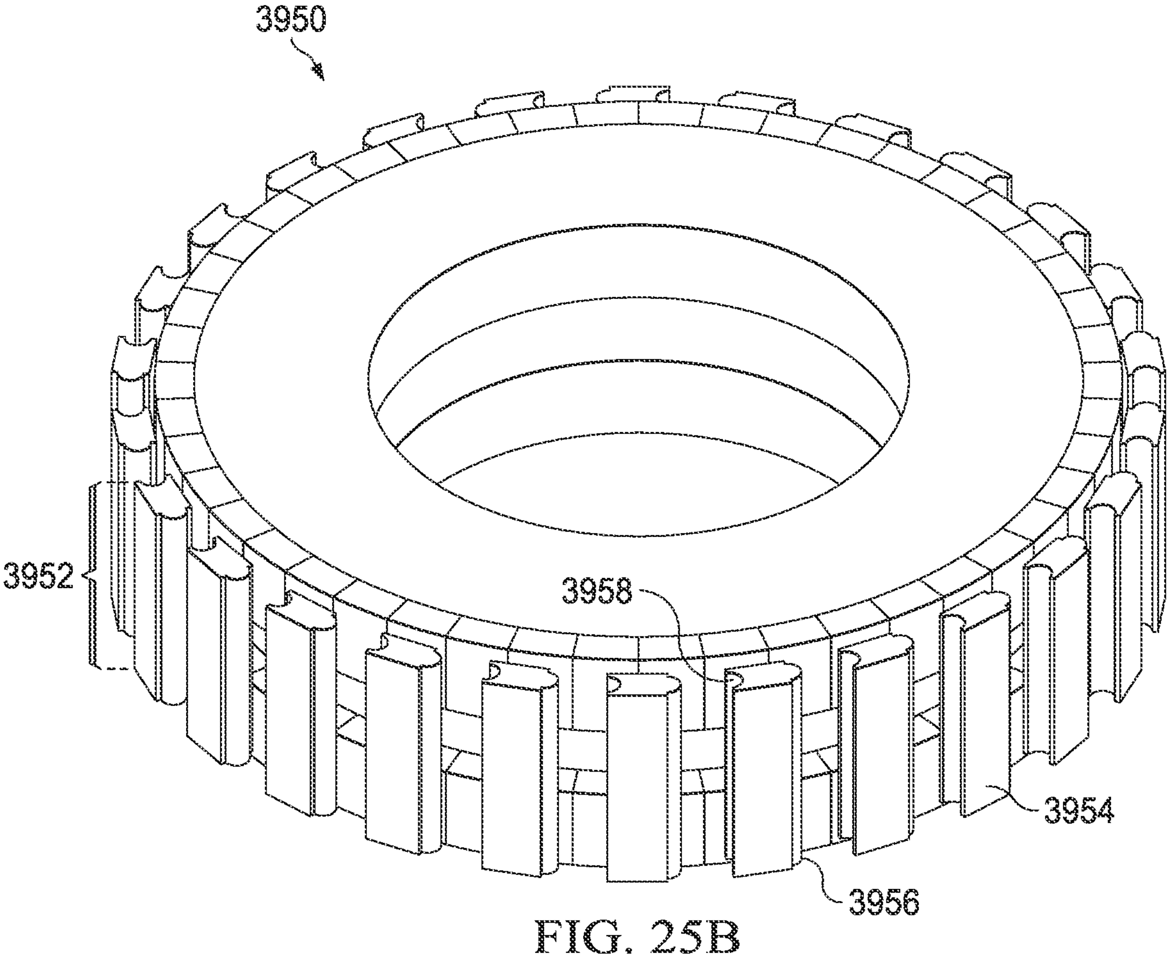
FIG. 25B is a perspective view of a transverse flux magnetic gear having a segmented modulator according to aspects of the disclosure.

In various embodiments, a modulator 3810 of the type described with respect to FIG. 23 may be utilized in conjunction with other magnetic gear topologies. FIG. 25A illustrates an axial flux magnetic gear having a modulator 3902 with magnetically permeable segments 3904 having protrusions 3906 and indentations 3908. FIG. 25B illustrates a transverse flux magnetic gear 3950 having a modulator 3952 with magnetically permeable segments 3954 having protrusions 3956 and indentations 3958. In FIG. 25A and FIG. 25B, the non-magnetic segments of the modulators (3902, 3952) are omitted for clarity.

Figure 26:
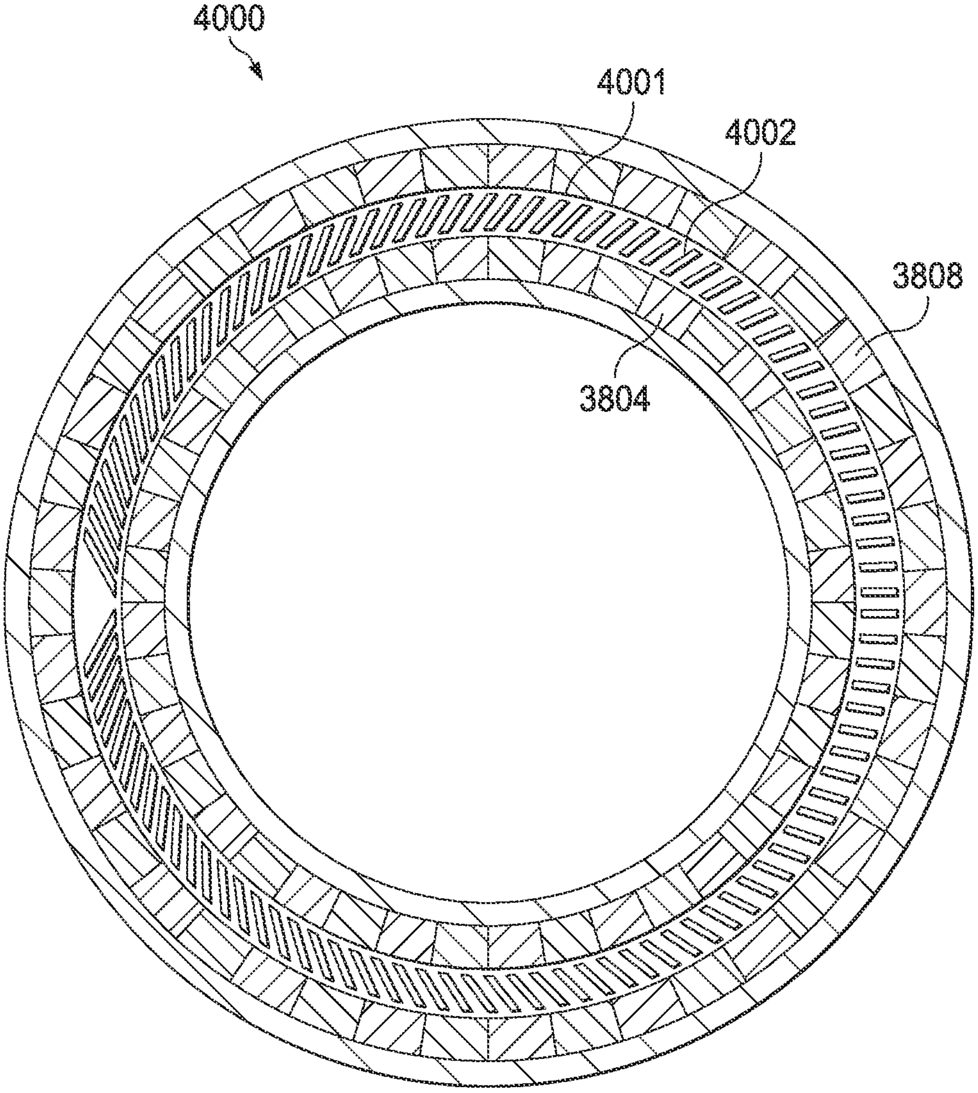
FIG. 26 is a cross sectional view of a concentric magnetic gear having angled modulators according to aspects of the disclosure.
Figure 27A:
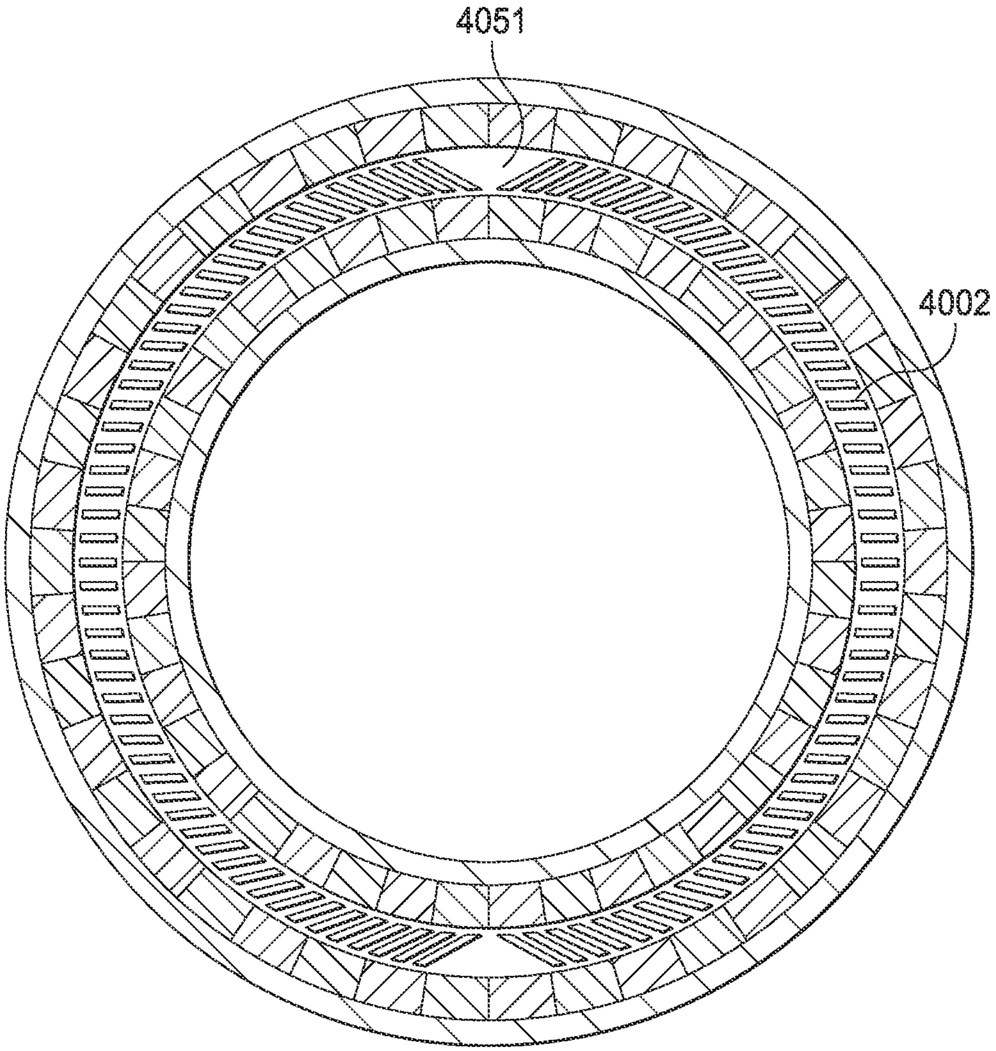
FIGS. 27A-27C are cross sectional views of concentric magnetic gears having angled modulators arranged to reduce unbalanced magnetic forces according to aspects of the disclosure.
Figure 27B:
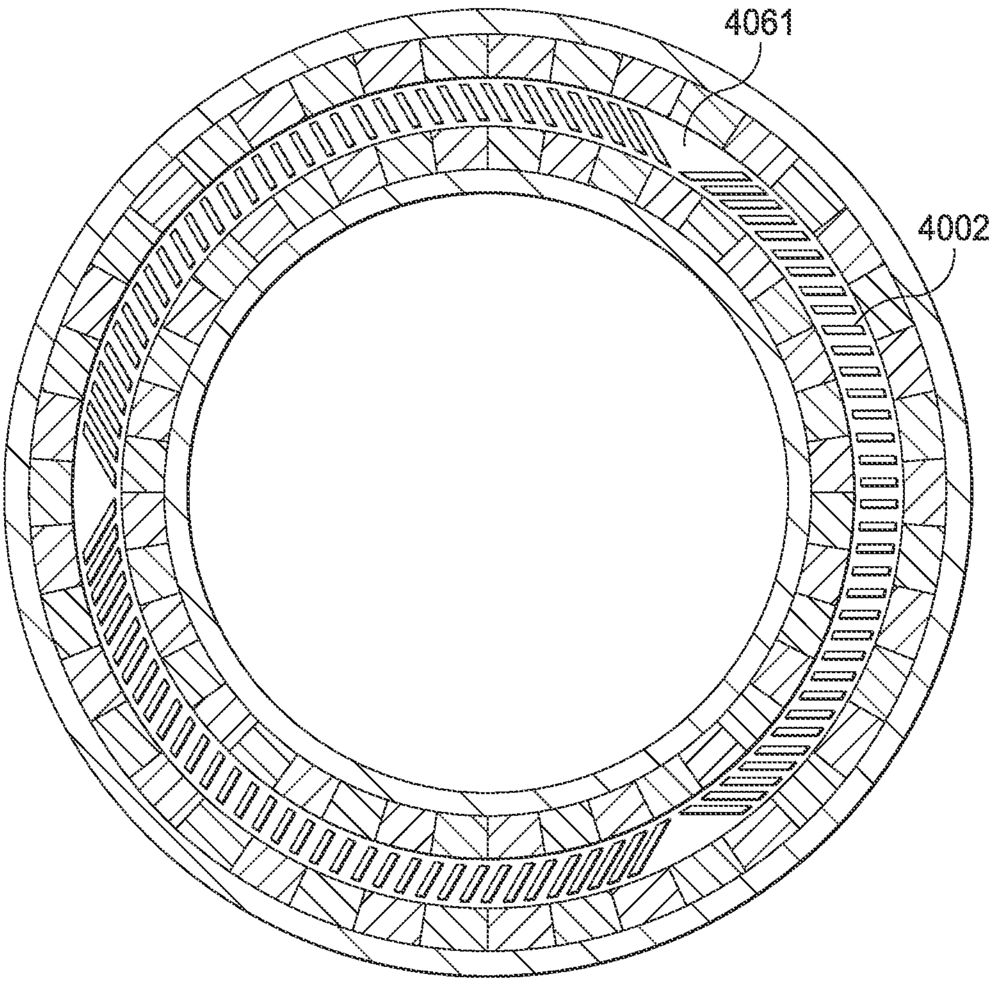
Figure 27C:
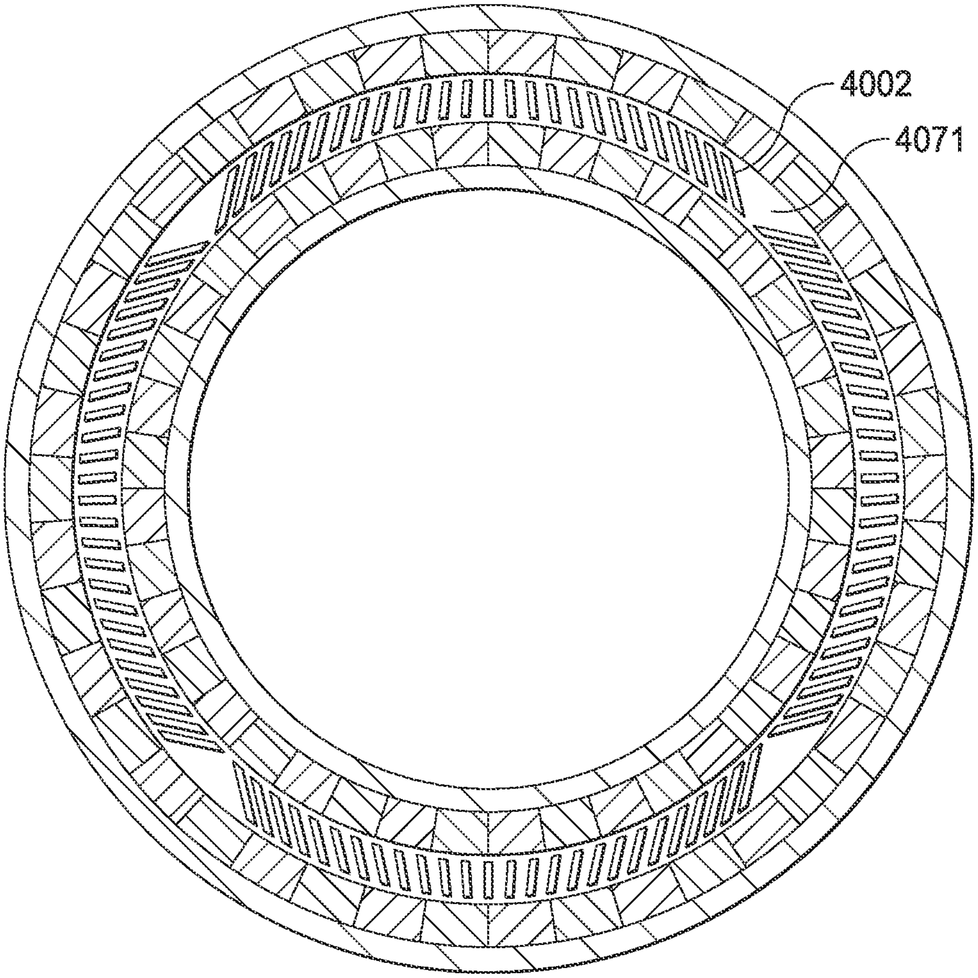
Figure 28A:
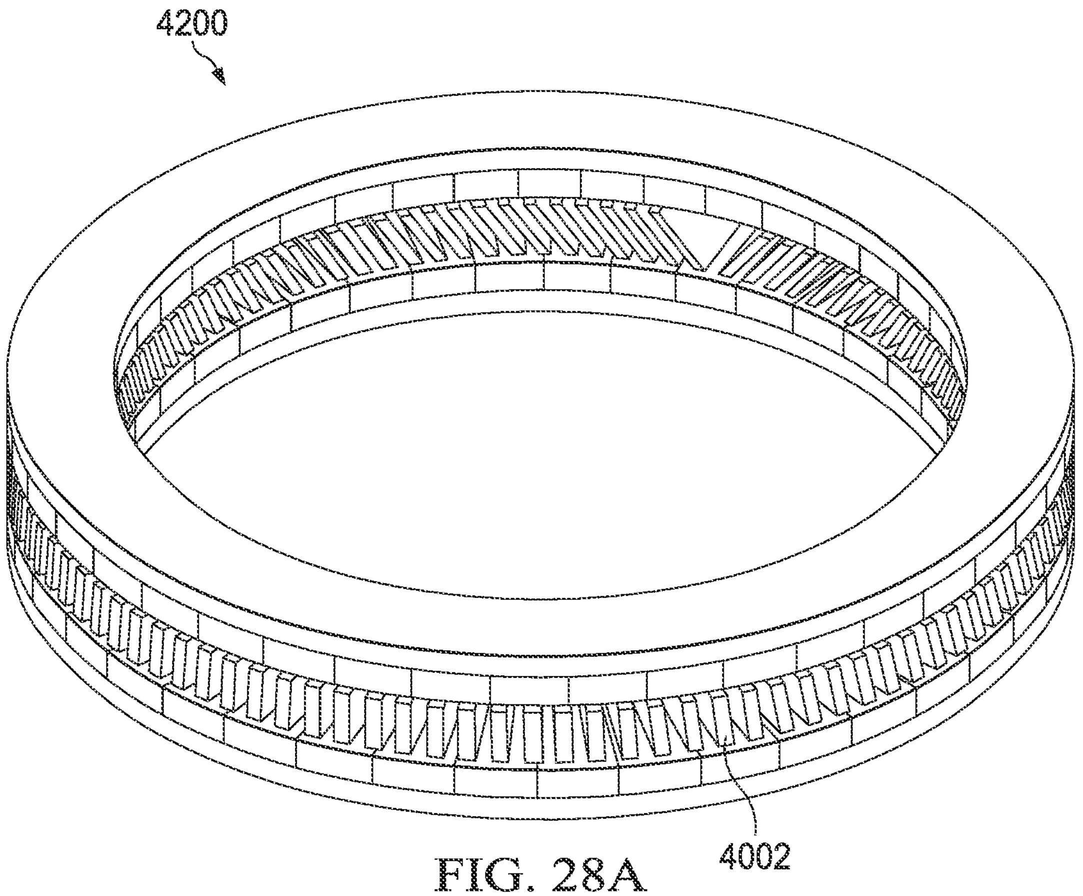
FIG. 28A is a perspective view of an axial flux magnetic gear having angled modulators according to aspects of the disclosure.
Figure 28B:
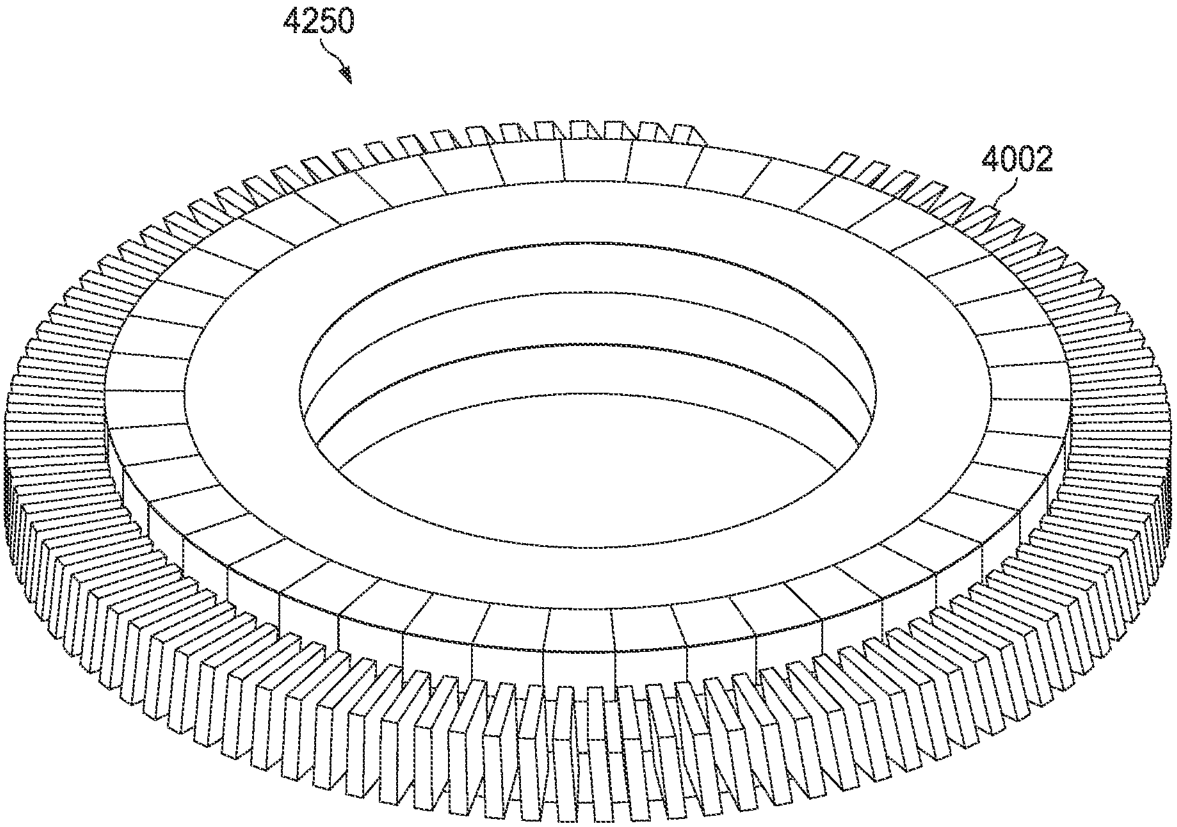
FIG. 28B is a perspective view of a transverse flux magnetic gear having angled modulators according to aspects of the disclosure.

FIG. 26 is a cross sectional view of a concentric magnetic gear 4000 having shaped modulator segments 4002. A flux modulator 4001 includes a plurality of modulator segments 4002. In various embodiments, each modulator segment of the plurality of modulator segments 4002 maps an electromagnetic angle from the first plurality of magnetic pole pairs 3804 to the second plurality of magnetic pole pairs 3808. The number of modulator segments 4002 does not need to be related to the number of pole pairs in the first plurality of magnetic pole pairs 3804 or the second plurality of magnetic pole pairs 3808. In various embodiments, a single gear may have a plurality of modulator segments 4002 with a plurality of different shapes. In various embodiments, the modulator segments 4002 may be arranged to reduce or eliminate unbalanced magnetic forces acting on either the first plurality of magnetic pole pairs 3804 or the second plurality of magnetic pole pairs 3808. FIG. 27A illustrates a modulator 4051 with two sections of modulator segments 4002. FIG. 27B illustrates a modulator 4061 with three sections of modulator segments 4002. FIG. 27C illustrates a modulator 4071 with four sections of modulator segments 4002. While FIG. 26 to FIG. 27C illustrate modulators with one to four sections of modular segments, in some embodiments, any number of sections of modular segments can be utilized. In various embodiments, the modulator segments 4002 could be applied to other magnetic gear topologies. FIG. 28A illustrates an axial flux magnetic gear 4200 having modulator segments 4002, each of which maps an electromagnetic angle from a first plurality of magnetic pole pairs (e.g., the first plurality of magnetic pole pairs 3804 of FIG. 26) to a second plurality of magnetic pole pairs (e.g., the second plurality of magnetic pole pairs 3808 of FIG. 26). FIG. 28B illustrates a transverse flux magnetic gear 4250 having modulator segments 4002, each of which maps an electromagnetic angle from a first plurality of magnetic pole pairs (e.g., the first plurality of magnetic pole pairs 3804 of FIG. 26) to a second plurality of magnetic pole pairs (e.g., the second plurality of magnetic pole pairs 3808 of FIG. 26).

Figure 29A:
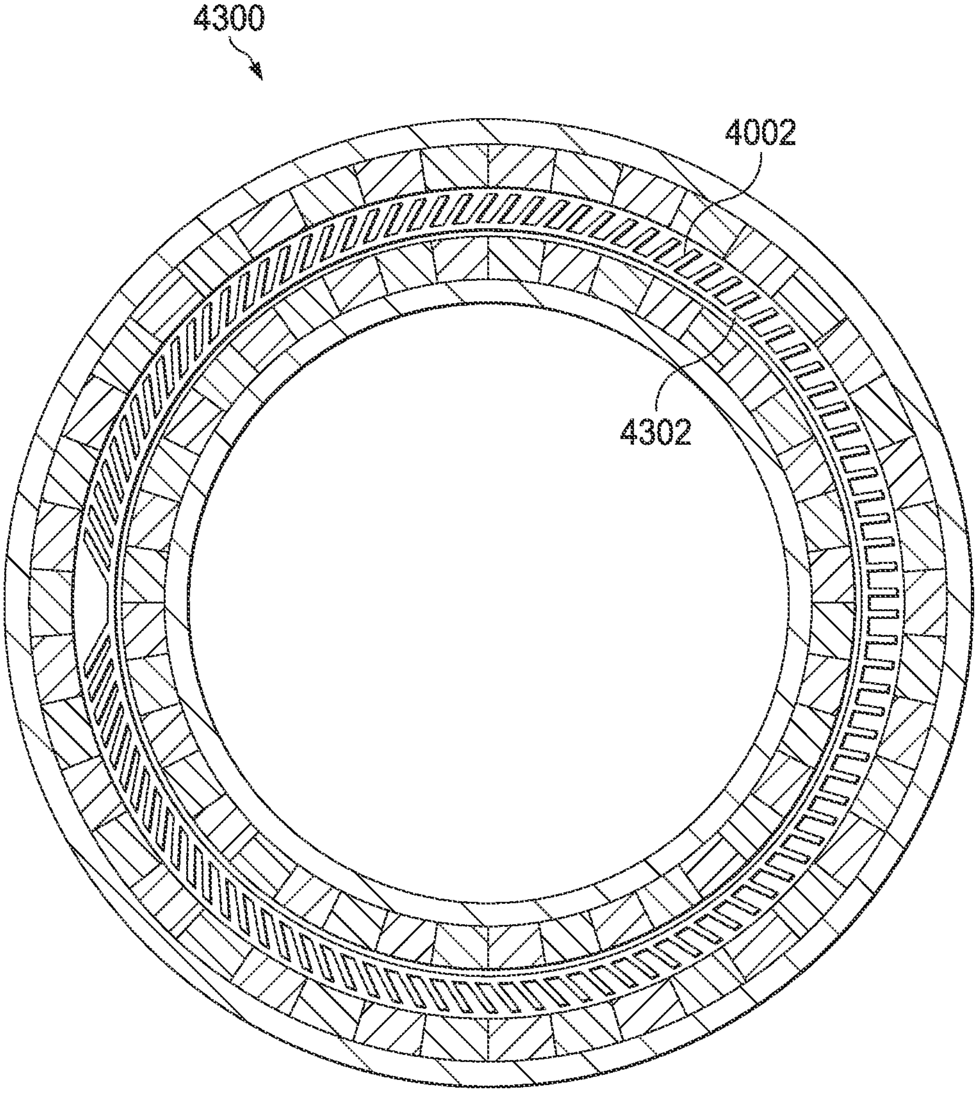
FIGS. 29A-29B are cross sectional views of concentric magnetic gears having angled modulators and features to facilitate fabrication according to aspects of the disclosure.
Figure 29B:
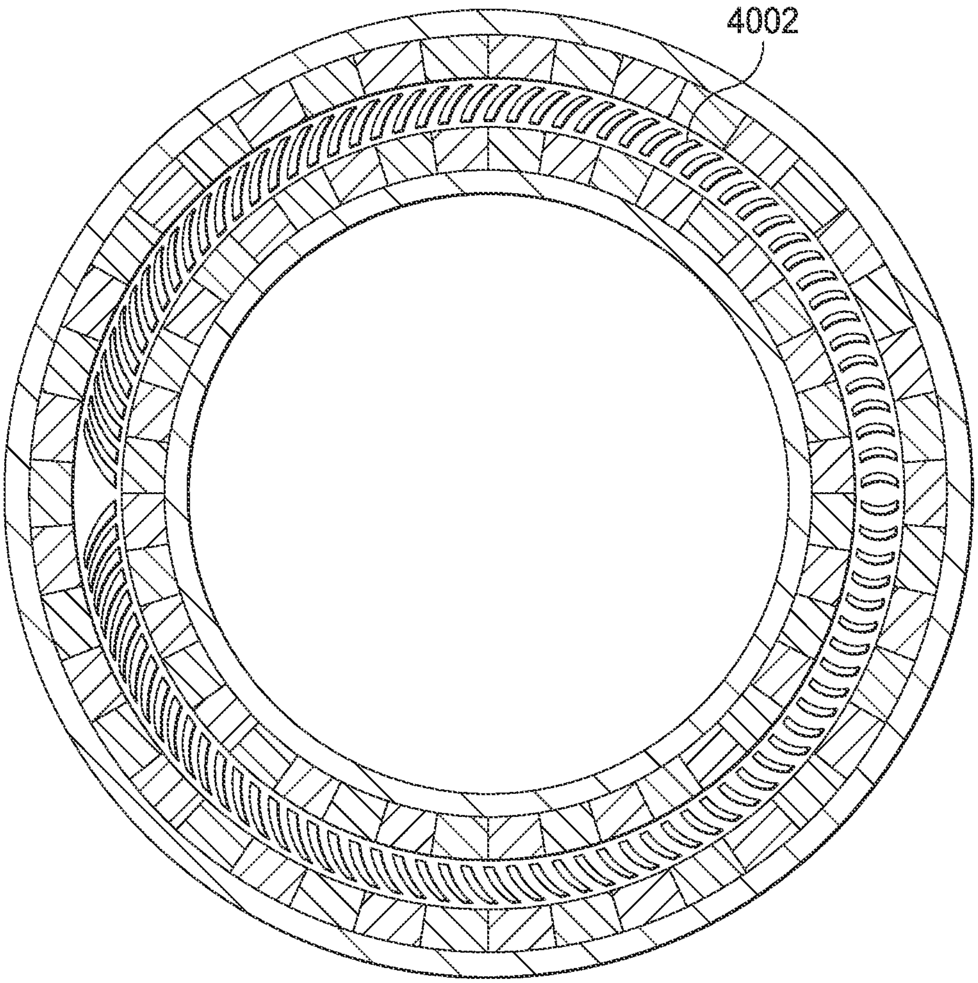

FIG. 29A to FIG. 29B illustrate embodiments of a modulator 4300 designed with features to facilitate fabrication. In various embodiments, the modulator is fabricated with a bridge 4302, as illustrated in FIG. 29A. The gaps between the modulator segments 4002 are then filled with, for example, a non-magnetic material. The bridge could, in various embodiments, then be machined off to create the modulator 4300 having a plurality of modulator segments 4002. In some embodiments, each modulator segment may have a protrusion on one side and an indentation on the other side, as illustrated in FIG. 29B.

In various embodiments, the anterior low pole-count rotor of the axial flux coaxial magnetic gear is the high-speed rotor and the posterior high pole-count rotor of the axial flux coaxial magnetic gear is fixed, leaving the modulators as the low-speed rotor that is free to rotate. Alternatively, the modulators may be fixed, and the high pole-count posterior rotor may act as the low-speed rotor. For all magnetic gears, involving the eighth, ninth, and tenth technologies, each rotor may contain surface permanent magnets of conventional or Halbach topology, or be of the consequent pole, flux focusing, or reluctance topologies.

In various embodiments, magnetic gears offer potential advantages, such as improved reliability, reduced maintenance, reduced acoustic noise, and inherent overload protection, over mechanical gears. The cycloidal type magnetic gearbox with multiple rotors is capable of achieving very high gear ratios which are of interest to industries such as wind or wave energy conversion, space traction or actuation, or robotics for automation.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A cycloidal magnetic gear comprising:
- an outer rotor;
- a first plurality of magnetic pole pairs disposed on an inner circumference of the outer rotor;
- a first inner rotor disposed within the outer rotor and having a second plurality of magnetic pole pairs disposed on an outer circumference thereof;
- a second inner rotor disposed within the outer rotor and having a third plurality of magnetic pole pairs disposed on an outer circumference thereof,
- a third inner rotor disposed within the outer rotor and having a fourth plurality of magnetic pole pairs disposed on an outer circumference thereof;
- wherein, the first inner rotor and the third inner rotor have a thickness of approximately half the thickness of the second inner rotor; and
- wherein, the first inner rotor, the second inner rotor, and the third inner rotor balance moments acting on a drive shaft.

2. The cycloidal magnetic gear of claim 1, wherein the outer rotor is stationary.

3. The cycloidal magnetic gear of claim 1, wherein the first inner rotor, the second inner rotor, and the third inner rotor revolve in an orbital fashion about a central axis of the outer rotor.

4. The cycloidal magnetic gear of claim 3, wherein the first inner rotor, the second inner rotor, and the third inner rotor are coupled to an input shaft, the input shaft being aligned with the central axis of the outer rotor.

5. The cycloidal magnetic gear of claim 4, wherein the first inner rotor and the third inner rotor are offset from the central axis of the outer rotor towards a first side of the input shaft.

6. The cycloidal magnetic gear of claim 5, wherein the second inner rotor is offset from the central axis of the outer rotor towards a second side of the input shaft.

7. The cycloidal magnetic gear of claim 6, wherein offset placement of the first inner rotor, the second inner rotor, and the third inner rotor balances mass and forces acting on the input shaft.

8. The cycloidal magnetic gear of claim 3, wherein:
- the first inner rotor rotates about a central axis of the first inner rotor;
- the second inner rotor rotates about a central axis of the second inner rotor; and
- the third inner rotor rotates about a central axis of the third inner rotor.

9. The cycloidal magnetic gear of claim 8, wherein rotation of the first inner rotor, the second inner rotor, and the third inner rotor drives a low-speed shaft.

10. The cycloidal magnetic gear of claim 1, comprising:
- a fifth plurality of magnetic pole pairs disposed around an inner circumference of the outer rotor parallel to the first plurality of magnetic pole pairs; and
- a sixth plurality of magnetic pole pairs disposed around an inner circumference of the outer rotor parallel to the first plurality of magnetic pole pairs.

11. The cycloidal magnetic gear of claim 10, wherein:
- the second plurality of magnetic pole pairs interacts with the first plurality of magnetic pole pairs;
- the third plurality of magnetic pole pairs interacts with the fifth plurality of magnetic pole pairs; and
- the fourth plurality of magnetic pole pairs interacts with the sixth plurality of magnetic pole pairs.

12. The cycloidal magnetic gear of claim 11, wherein, for each revolution of the first inner rotor about a central axis of the outer rotor, the first inner rotor rotates by one pole pair relative to the outer rotor.

13. A method of assembling a cycloidal magnetic gear, the method comprising:
- coupling a first plurality of magnetic pole pairs, a second plurality of magnetic pole pairs, and a third plurality of magnetic pole to an inner circumference of an outer rotor;
- coupling a first inner rotor, a second inner rotor, and a third inner rotor to an input shaft;
- coupling a fourth plurality of magnetic pole pairs to the first inner rotor, a fifth plurality of magnetic pole pairs to the second inner rotor, and a sixth plurality of magnetic pole pairs to the third inner rotor; and
- disposing the first inner rotor, the second inner rotor, and the third inner rotor within the outer rotor such that the fourth plurality of magnetic pole pairs interacts with the first plurality of magnetic pole pairs, the fifth plurality of magnetic pole pairs interacts with the second plurality of magnetic pole pairs, and the sixth plurality of magnetic pole pairs interacts with the third plurality of magnetic pole pairs.

* * * * *